US011461973B2

(12) United States Patent
Pinchon

(10) Patent No.: US 11,461,973 B2
(45) Date of Patent: Oct. 4, 2022

(54) VIRTUAL REALITY LOCOMOTION VIA HAND GESTURE

(71) Applicant: Meta Platforms Technologies, LLC, Menlo Park, CA (US)

(72) Inventor: Etienne Pinchon, London (GB)

(73) Assignee: Meta Platforms Technologies, LLC, Menlo Park, CA (US)

( * ) Notice: Subject to any disclaimer, the term of this patent is extended or adjusted under 35 U.S.C. 154(b) by 1 day.

(21) Appl. No.: 17/131,543

(22) Filed: Dec. 22, 2020

(65) Prior Publication Data

US 2022/0198755 A1    Jun. 23, 2022

(51) Int. Cl.
*G06T 19/00* (2011.01)
*G06F 3/01* (2006.01)

(52) U.S. Cl.
CPC ............ *G06T 19/003* (2013.01); *G06F 3/011* (2013.01); *G06F 3/017* (2013.01)

(58) Field of Classification Search
CPC ...... G06F 3/011; G06F 3/0219; G06F 3/0233; G06F 3/0425; G06F 3/1423; G06F 3/0346; G06F 3/017; G06F 3/0304; G06F 3/04886; G06T 19/003; G06T 19/006; G06T 2219/024; G06V 40/107; G06V 40/28; H04L 63/107; H04L 65/4015; H04L 65/4046; H04L 65/607
See application file for complete search history.

(56) References Cited

U.S. PATENT DOCUMENTS

| 6,842,175 | B1 | 1/2005 | Schmalstieg et al. |
| 7,701,439 | B2 | 4/2010 | Hillis et al. |
| 8,558,759 | B1 | 10/2013 | Gomez et al. |
| 8,947,351 | B1 | 2/2015 | Noble |
| 9,117,274 | B2 | 8/2015 | Liao et al. |
| 9,292,089 | B1 | 3/2016 | Sadek |

(Continued)

FOREIGN PATENT DOCUMENTS

WO    2018235371 A1    12/2018

OTHER PUBLICATIONS

"Unity Gets Toolkit for Common AR/VR Interactions" [accessed Apr. 7, 2020] Unity XR Interaction Toolkit Preview Dec. i9, 20HI.
(Continued)

*Primary Examiner* — Nelson M Rosario
(74) *Attorney, Agent, or Firm* — Potomac Law Group, PLLC

(57) ABSTRACT

Embodiments described herein disclose methods and systems directed to locomotion in virtual reality (VR) based on hand gestures of a user. In some implementations, the user can navigate between locations using hand gestures that trigger teleportation. In other implementations, the user can separately control forward/backward movement and the direction orientation the user is facing. The separate control can either be with one hand when making different gestures or by using different hands to control movement and orientation. In some implementations, a dragging gesture by the user is interpreted by the VR system to trigger movement. In this way, the user can turn in place without moving forward, move forward without turning, or can move forward and turn, while controlling speed, all with a single gesture.

20 Claims, 22 Drawing Sheets

(56) References Cited

U.S. PATENT DOCUMENTS

| | | | |
|---|---|---|---|
| 9,477,368 B1 | 10/2016 | Filip et al. | |
| 9,817,472 B2 | 11/2017 | Lee et al. | |
| 10,220,303 B1 | 3/2019 | Schmidt et al. | |
| 10,248,284 B2 | 4/2019 | Itani et al. | |
| 10,473,935 B1 | 11/2019 | Gribetz et al. | |
| 10,521,944 B2 | 12/2019 | Sareen et al. | |
| 2008/0089587 A1 | 4/2008 | Kim et al. | |
| 2010/0306716 A1 | 12/2010 | Perez | |
| 2011/0267265 A1 | 11/2011 | Stinson | |
| 2012/0069168 A1 | 3/2012 | Huang et al. | |
| 2012/0143358 A1 | 6/2012 | Adams et al. | |
| 2012/0188279 A1 | 7/2012 | Demaine | |
| 2012/0206345 A1 | 8/2012 | Langridge | |
| 2012/0218183 A1 | 8/2012 | Givon et al. | |
| 2012/0275686 A1 | 11/2012 | Wilson et al. | |
| 2012/0293544 A1 | 11/2012 | Miyamoto et al. | |
| 2013/0063345 A1 | 3/2013 | Maeda | |
| 2013/0125066 A1 | 5/2013 | Klein et al. | |
| 2013/0147793 A1 | 6/2013 | Jeon et al. | |
| 2013/0182902 A1 | 7/2013 | Holz | |
| 2013/0265220 A1 | 10/2013 | Fleischmann et al. | |
| 2014/0125598 A1 | 5/2014 | Cheng et al. | |
| 2014/0236996 A1 | 8/2014 | Masuko et al. | |
| 2014/0357366 A1 | 12/2014 | Koganezawa et al. | |
| 2014/0375691 A1 | 12/2014 | Kasahara | |
| 2015/0035746 A1 | 2/2015 | Cockburn et al. | |
| 2015/0054742 A1 | 2/2015 | Imoto et al. | |
| 2015/0062160 A1 | 3/2015 | Sakamoto et al. | |
| 2015/0153833 A1 | 6/2015 | Pinault et al. | |
| 2015/0160736 A1 | 6/2015 | Fujiwara | |
| 2015/0169076 A1 | 6/2015 | Cohen et al. | |
| 2015/0181679 A1 | 6/2015 | Liao et al. | |
| 2015/0206321 A1 | 7/2015 | Scavezze et al. | |
| 2015/0220150 A1 | 8/2015 | Plagemann et al. | |
| 2015/0261659 A1 | 9/2015 | Bader et al. | |
| 2016/0110052 A1 | 4/2016 | Kim et al. | |
| 2016/0147308 A1 | 5/2016 | Gelman et al. | |
| 2016/0170603 A1* | 6/2016 | Bastien | H04N 13/254 348/49 |
| 2016/0378291 A1 | 12/2016 | Pokrzywka | |
| 2017/0060230 A1 | 3/2017 | Faaborg et al. | |
| 2017/0109936 A1 | 4/2017 | Powderly et al. | |
| 2017/0139478 A1 | 5/2017 | Jeon et al. | |
| 2017/0192513 A1 | 7/2017 | Karmon et al. | |
| 2017/0262063 A1 | 9/2017 | Blénessy et al. | |
| 2017/0278304 A1 | 9/2017 | Hildreth et al. | |
| 2017/0287225 A1 | 10/2017 | Powderly et al. | |
| 2017/0296363 A1 | 10/2017 | Yetkin et al. | |
| 2017/0364198 A1 | 12/2017 | Yoganandan et al. | |
| 2018/0059901 A1 | 3/2018 | Gullicksen | |
| 2018/0107278 A1 | 4/2018 | Goel et al. | |
| 2018/0113599 A1 | 4/2018 | Yin | |
| 2018/0303446 A1 | 10/2018 | Schweizer | |
| 2018/0307303 A1 | 10/2018 | Powderly et al. | |
| 2018/0322701 A1 | 11/2018 | Pahud et al. | |
| 2018/0335925 A1 | 11/2018 | Hsiao et al. | |
| 2018/0357780 A1 | 12/2018 | Young et al. | |
| 2019/0050071 A1 | 2/2019 | Liu et al. | |
| 2019/0057531 A1 | 2/2019 | Sareen et al. | |
| 2019/0094981 A1 | 3/2019 | Bradski et al. | |
| 2019/0107894 A1 | 4/2019 | Hebbalaguppe et al. | |
| 2019/0213792 A1 | 7/2019 | Jakubzak et al. | |
| 2019/0258318 A1 | 8/2019 | Qin et al. | |
| 2019/0278376 A1 | 9/2019 | Kutliroff et al. | |
| 2019/0279424 A1 | 9/2019 | Clausen et al. | |
| 2019/0286231 A1 | 9/2019 | Burns et al. | |
| 2019/0347865 A1 | 11/2019 | Hackett et al. | |
| 2019/0362562 A1 | 11/2019 | Benson | |
| 2019/0369391 A1 | 12/2019 | Cordesses et al. | |
| 2019/0377416 A1 | 12/2019 | Alexander | |
| 2020/0082629 A1 | 3/2020 | Jones et al. | |
| 2020/0097077 A1 | 3/2020 | Nguyen et al. | |
| 2020/0097091 A1 | 3/2020 | Chou et al. | |
| 2020/0129850 A1* | 4/2020 | Ohashi | A63F 13/213 |
| 2020/0218423 A1* | 7/2020 | Ohashi | G06F 3/04186 |
| 2020/0225736 A1 | 7/2020 | Schwarz et al. | |
| 2020/0225758 A1 | 7/2020 | Tang et al. | |
| 2020/0226814 A1 | 7/2020 | Tang et al. | |
| 2021/0076091 A1 | 3/2021 | Shohara | |

OTHER PUBLICATIONS

Hincapie-Ramos, J.D. et al. "GyroWand: IMU-based raycasting for augmented reality head-mounted displays." Proceedings of the 3rd ACM Symposium on Spatial User Interaction, Aug. 2015, pp. 89-98.

Mayer, S. et al. "The effect of offset correction and cursor on mid-air pointing in real and virtual environments." Proceedings of the 2018 CHI Conference on Human Factors in Computing Systems, Apr. 2018, pp. 1-13.

Olwal, A. et al. "Ttle Flexible Pointer: An Interaction Technique for Selection in Augmented and Virtual Reality," Proceedin9s of ACM Symposium on User Interface Software and Tect1nology (UIST), pp. 81-82, publication date Nov. 5, 2003.

Renner, P. et al. "Ray Casting", [accessed Apr. 7, 2020], 2 pages.

Schweigert, R. et al. "EyePointing: A gaze-based selection technique." Proceedings of Mensch and Computer, Sep. 8, 2019, pp. 719-723.

Argelaguet F., et al., "A Survey of 3D Object Selection Techniques for Virtual Environments," Computers & Graphics, 2013, vol. 37, No. 3, pp. 121-136.

International Search Report and Written Opinion for International Application No. PCT/US2020/051763, dated Feb. 3, 2021, 11 Pages.

Lee M.S., et al., "A Computer Vision System for on-Screen Item Selection by Finger Pointing," In Proceedings of the 2001 IEEE Computer Society Conference on Computer Vision and Pattern Recognition (CVPR), 2001, vol. 1, 8 pages.

Miardanbegi D., et al., "Eyesee Through: Unifying Tool Selection and Application in Virtual Environments," In 2019 EEE Conference on Virtual Reality and 3D User Interfaces (VR), 2019, pp. 474-483.

Mine M.R., et al., "Moving Objects in Space: Exploiting Proprioception in Virtual-Environment Interaction," In Proceedings of the 24th Annual Conference on Computer Graphics and Interactive Techniques, 1997, pp. 19-26.

Pfeuffer, et al., "Gaze+ Pinch Interaction in Virtual Reality," ACM, 2017, SUI '17, Brighton, United Kingdom, Oct. 16, 2017, 10 pages.

Cardoso J., "Comparison of Gesture, Gamepad, and Gaze-Based Locomotion for VR Worlds," Proceedings of the 22nd ACM Conference on Virtual Reality Software and Technology, Nov. 2, 2016, pp. 319-320.

International Preliminary Report on Patentability for International Application No. PCT/US2020/051763, dated Mar. 31, 2022, 10 pages.

International Search Report and Written Opinion for International Application No. PCT/US2021/063536 dated Mar. 22, 2022, 12 pages.

Tomberlin M., et al., "Gauntlet: Travel Technique for Immersive Environments using Non-Dominant Hand," IEEE Virtual Reality (VR), Mar. 18, 2017, pp. 299-300.

* cited by examiner

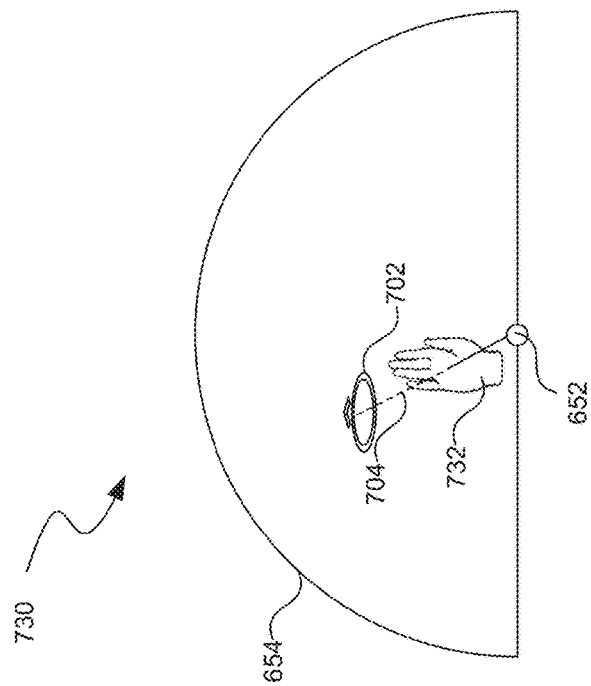
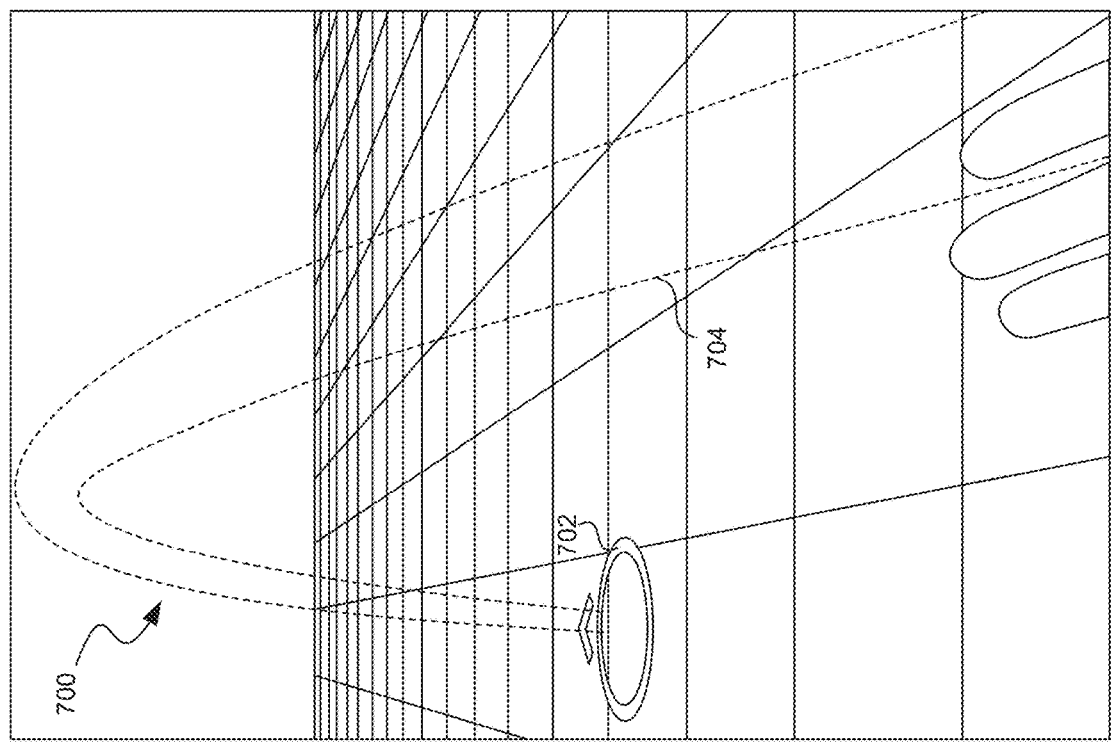

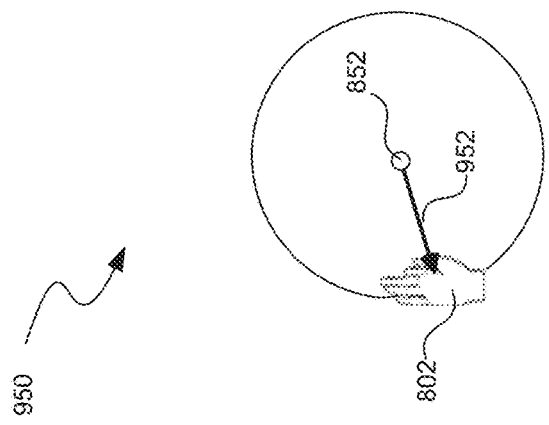
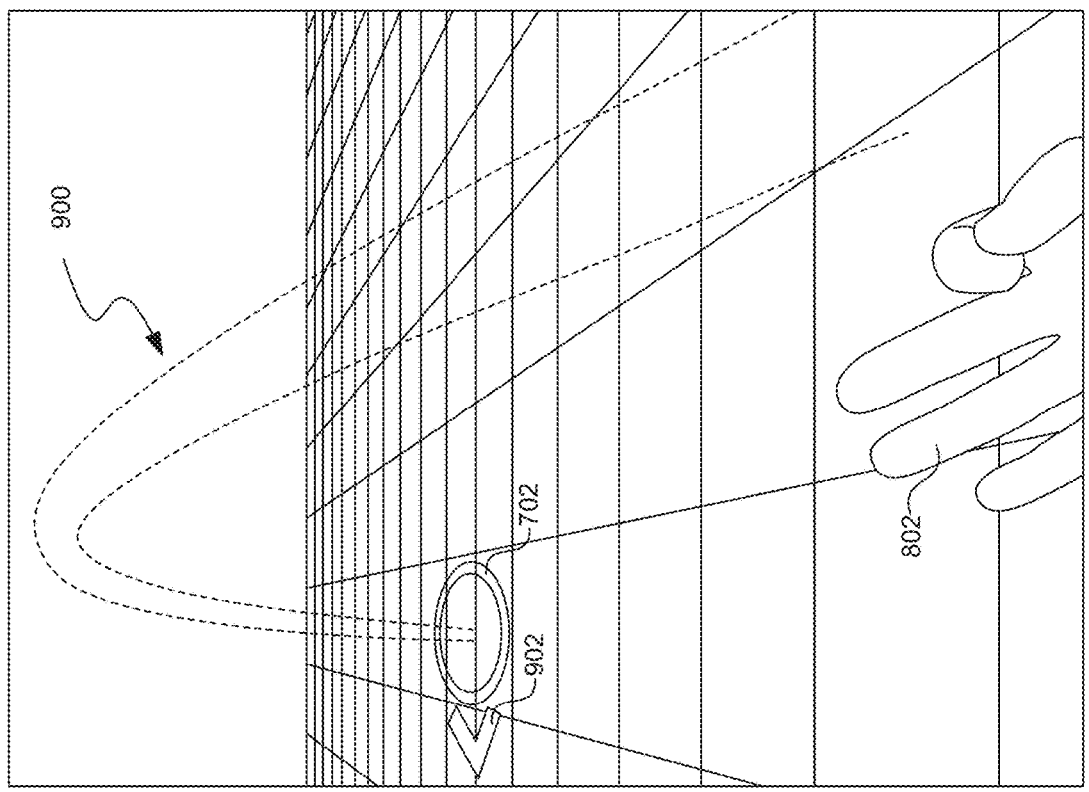

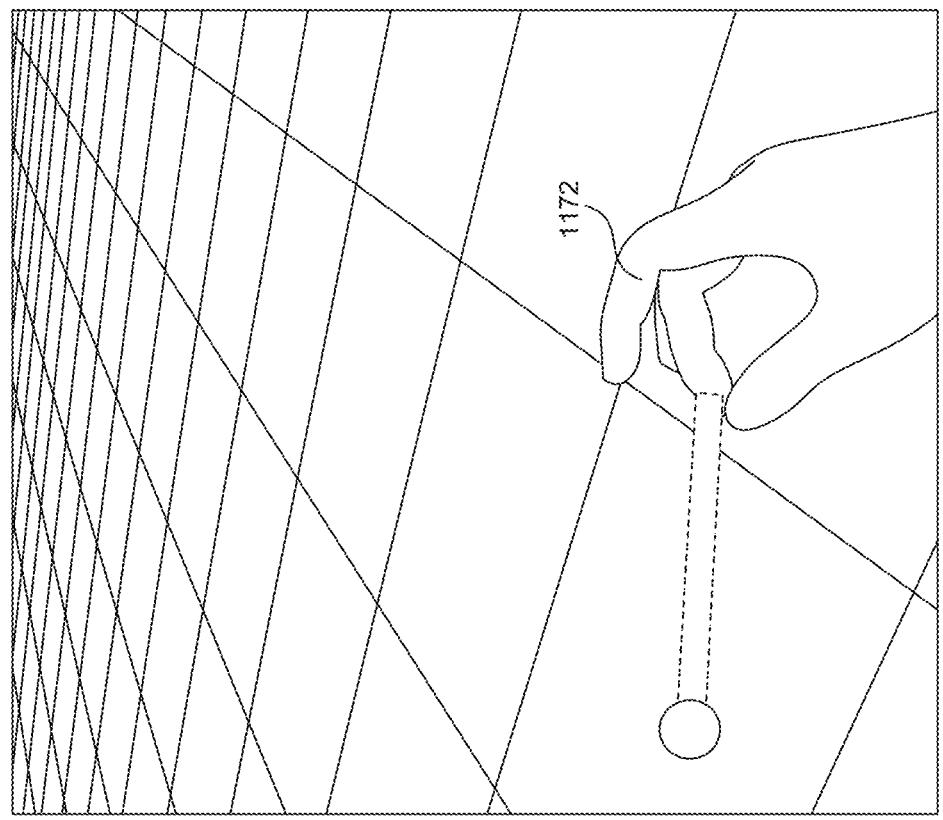
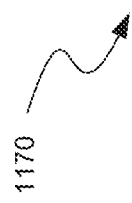
FIG. 11C

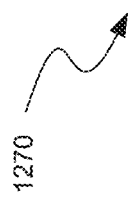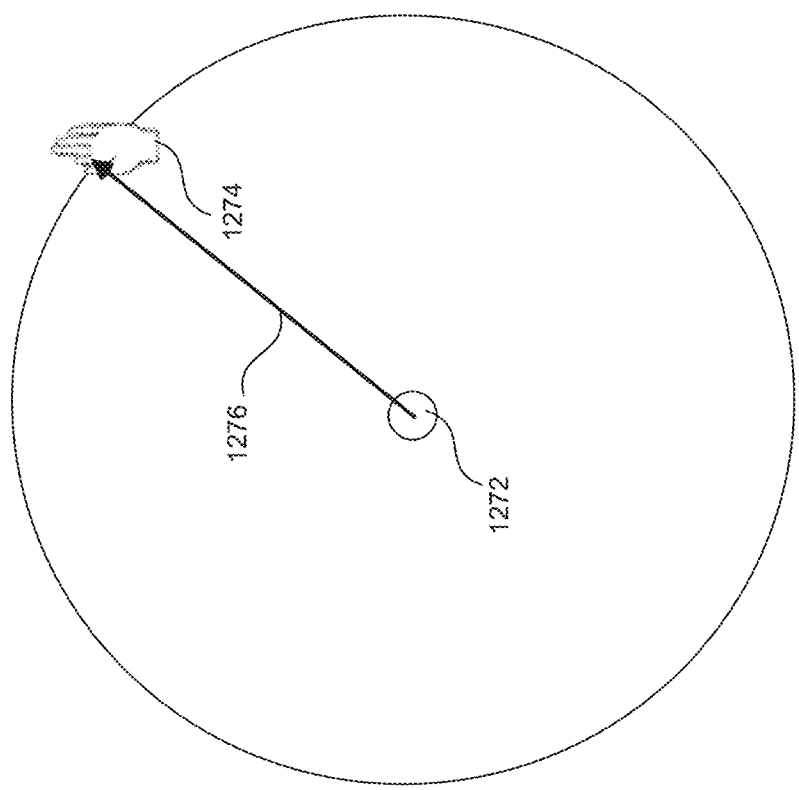
FIG. 12C

VIRTUAL REALITY LOCOMOTION VIA HAND GESTURE

TECHNICAL FIELD

The present disclosure is directed to methods and systems for locomotion in virtual reality (VR) based on user hand gestures.

BACKGROUND

Virtual reality (VR) environments can be provided by a variety of systems, such as projectors, head mounted displays, "cave" systems, etc. Users can interact with an artificial reality environment such as by selecting objects, moving, rotating, resizing, actuating controls, changing colors or skins, defining interactions between virtual objects, setting virtual forces to act on virtual objects, or practically any other imaginable action. Various interaction modalities exist for these taking such actions in a VR environment. For example, some systems can employ one or more of gaze controls, hand-held hardware devices, gesture controls, wearable devices (e.g., wrist bands), voice controls, etc. For example, in some cases a user operating in a VR environment can navigate between locations using commands issued via hand-held controller devices.

BRIEF DESCRIPTION OF THE DRAWINGS

FIG. 7A is an illustration depicting a hand gesture for teleportation.

FIG. 7B is an illustration depicting an operating radius for teleportation.

FIG. 9A is an illustration depicting a hand gesture for teleportation.

FIG. 9B is an illustration depicting an operating radius for teleportation.

FIG. 10A-1 is a flow diagram illustrating a process used in some implementations of the present technology for implementing a turn gesture with a position threshold.

FIG. 10A-2 is a flow diagram illustrating a process used in some implementations of the present technology for implementing a turn gesture with a timer threshold.

FIG. 11C is an illustration depicting a turn gesture for use in single-hand turn and movement locomotion.

FIG. 12C is an illustration of an operating radius of a hand position from an origin point.

The techniques introduced here may be better understood by referring to the following Detailed Description in conjunction with the accompanying drawings, in which like reference numerals indicate identical or functionally similar elements.

DETAILED DESCRIPTION

Figure 1:
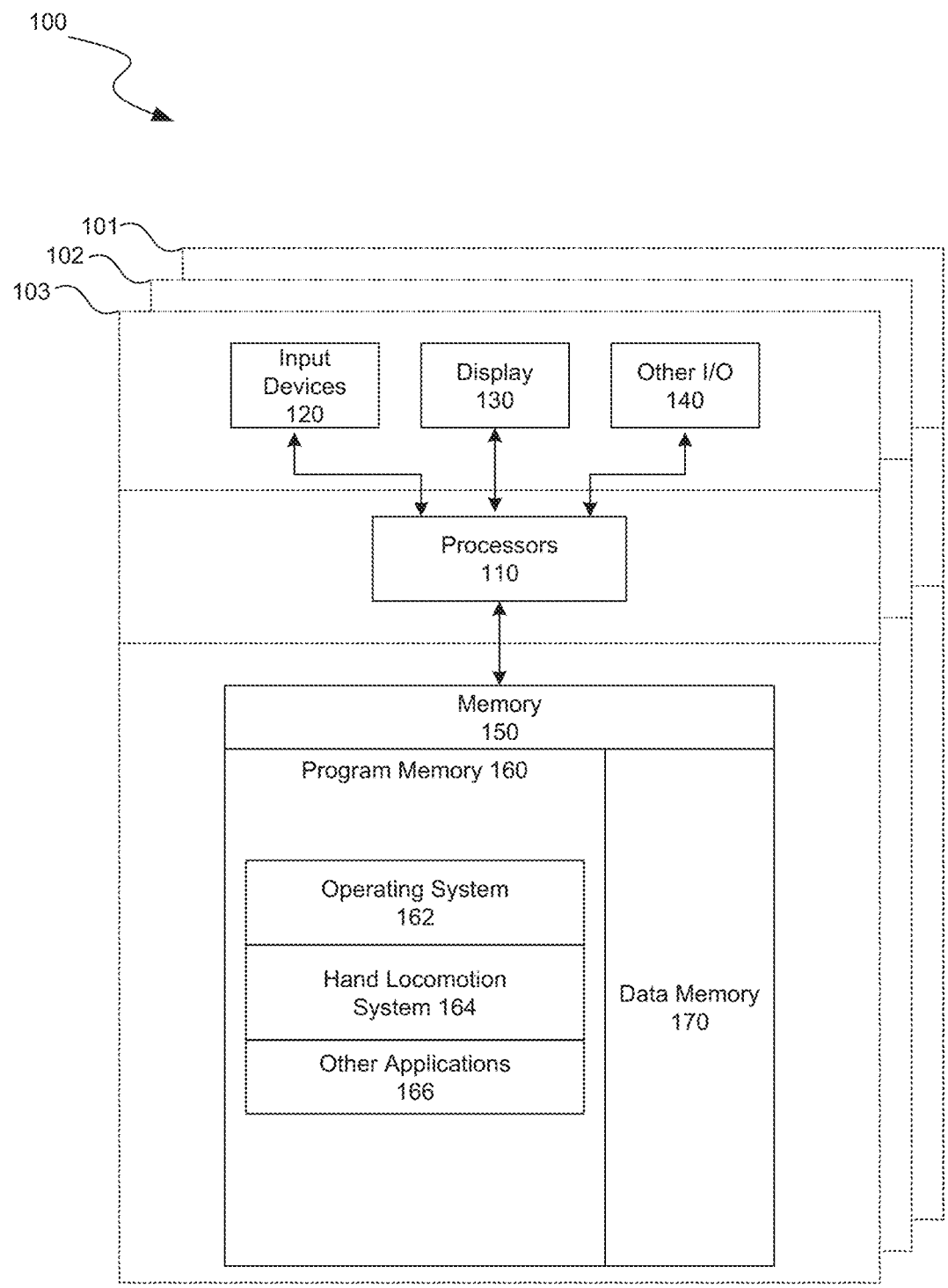
FIG. 1 is a block diagram illustrating an overview of devices on which some implementations of the present technology can operate.

Aspects of the present disclosure are directed to locomotion in artificial reality (e.g., virtual reality (VR)) via user hand gestures. The user can navigate (e.g., teleport or move) between locations using hand gestures. When teleporting the user can make a first hand gesture (e.g., palm up gesture) which sets a first origin point and casts a ray out from the user's hand. In some cases, the length of the ray is based on the hand's distance from the first origin point. The user can make a second hand gesture (e.g., pinching together fingers) which sets a destination point at the end of the ray. In some cases, the destination point is a second origin point, at which the user can control the direction (e.g., orientation) they will be facing after the teleportation. Upon releasing the second hand gesture, the user is transported to the destination with the orientation direction.

In some implementations, the user can separately control forward/backward movement and the direction orientation the user is facing. The separate control can either be with one hand when making different gestures (e.g., pinch with index finger vs pinch with ring finger) or by using different hands to control movement and orientation. The user can pinch and drag with a gesture to specify a direction of movement or can pinch and drag with a different gesture to specify orientation (e.g., turn-in-place by incremental degrees).

In some implementations, a dragging gesture by the user is interpreted by the VR system in an X/Y plane. The dragging gesture can form a vector from the origin point to a destination point in the plane. The length of the vector can specify the speed of movement. The angle of the vector as compared to the Y-axis can specify any turn amount. In this way, the user can turn in place without moving forward, move forward without turning, or can move forward and turn, while controlling speed, all with a single gesture.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Users can move in existing VR environments, however it can take the user a long time to travel between locations that are spread apart and generally requires that a user activate physical controls it signify a destination and/or movement amount. The present embodiment can improve computing and/or computer system processing by teleportation and locomotion movements based on hand gestures. The present embodiments of VR locomotion via hand gestures can improve computing efficiency by reducing the wireless or wired communications in the VR system by detecting the user hand gestures rather than receiving signals from controller devices. Also, the present embodiments improve the user experience by decreasing the travel time of the user between locations in the VR environment and eliminating the need for users to interact with cumbersome controllers.

Several implementations are discussed below in more detail in reference to the figures. FIG. 1 is a block diagram illustrating an overview of devices on which some implementations of the disclosed technology can operate. The devices can comprise hardware components of a computing system 100 that is capable of processing VR locomotion via hand gestures. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, hand locomotion system 164, and other application programs 166. Memory 150 can also include data memory 170 that can include teleportation data, hand gesture data, orientation data, locomotion data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
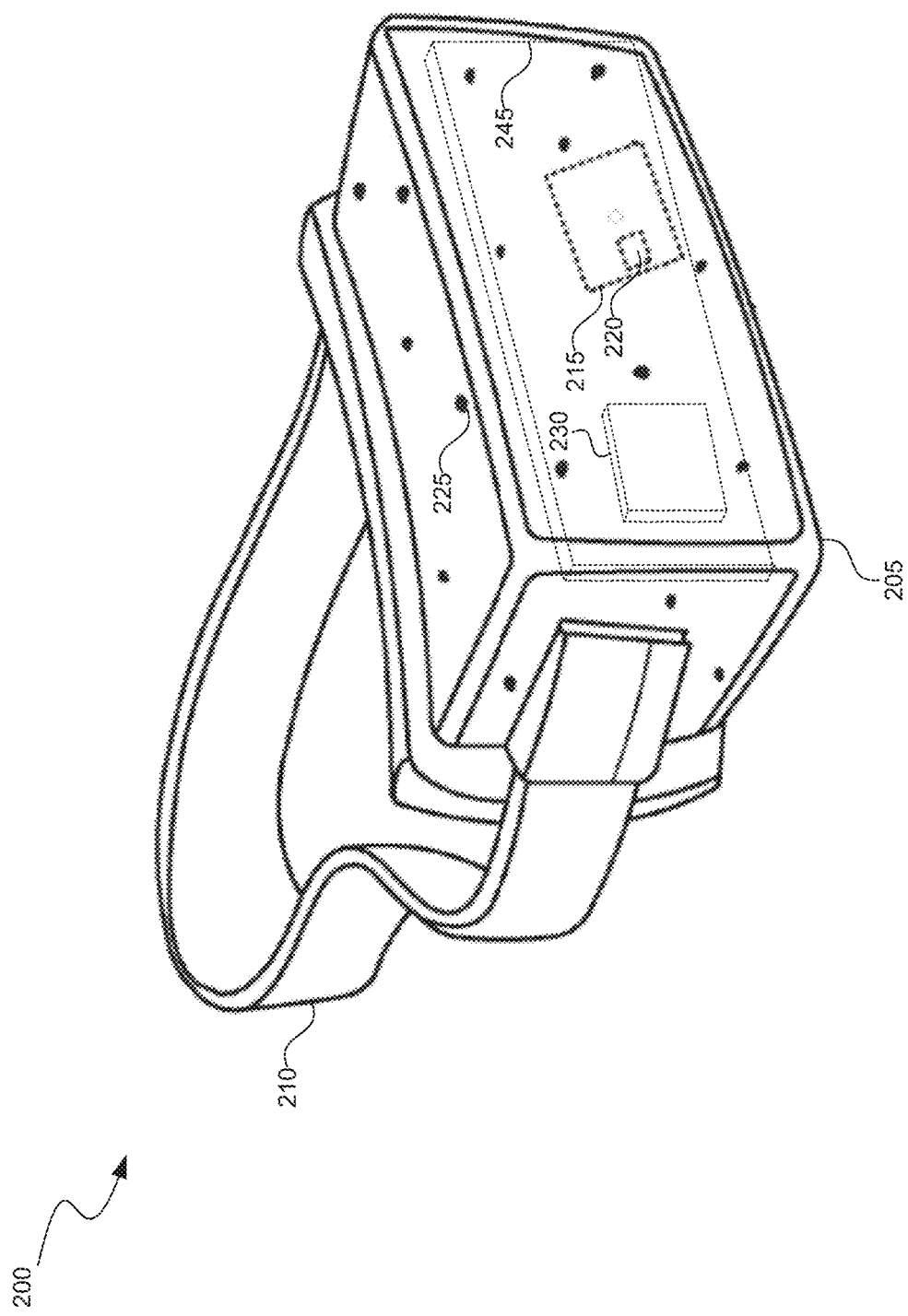
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3 DoF) or six degrees of freedom (6 DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
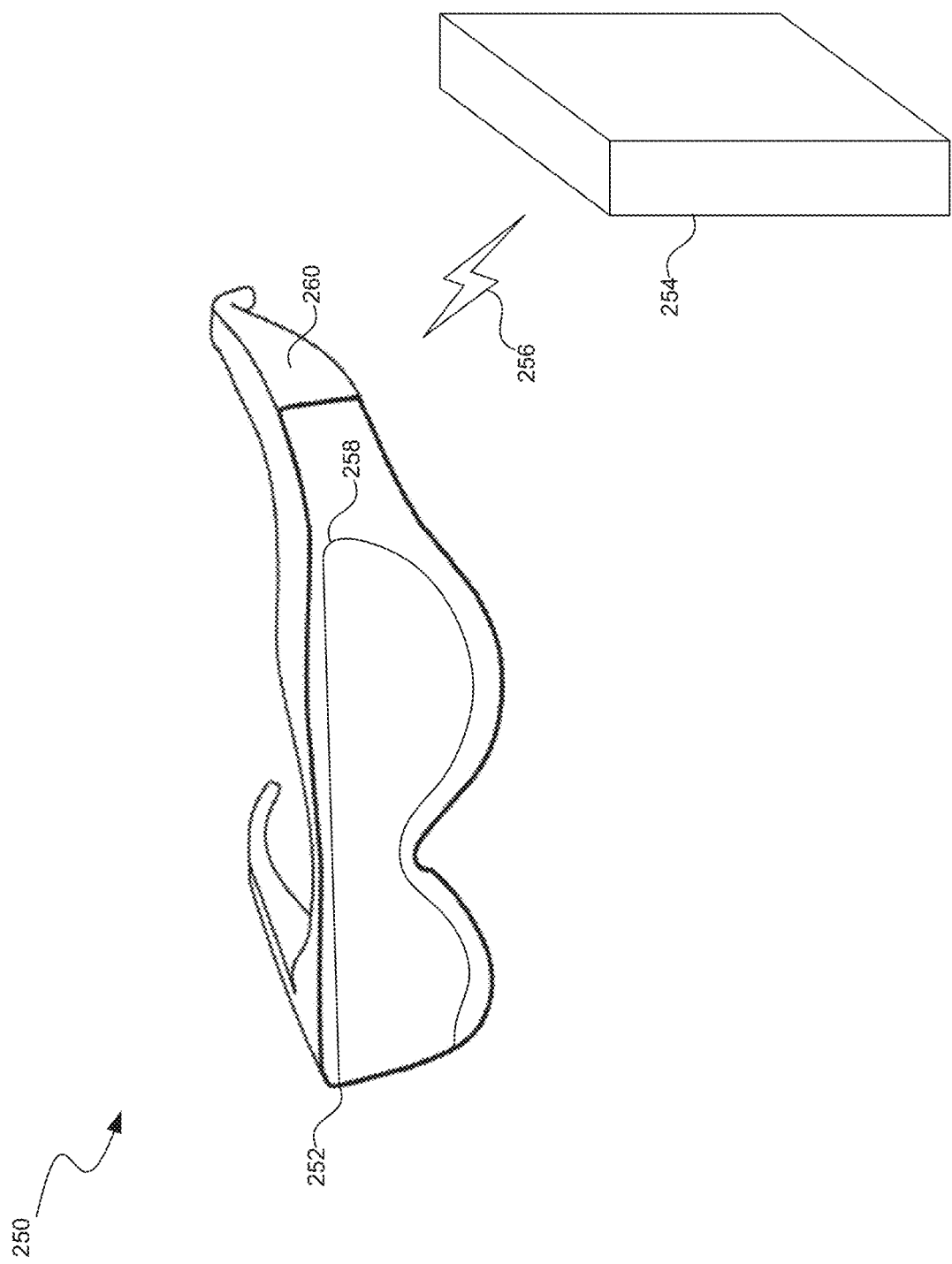
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3 DoF or 6 DoF, track portions of the user (e.g., hands, feet, head, or other body parts), map virtual objects to appear as stationary as the HMD 252 moves, and have virtual objects react to gestures and other real-world objects.

Figure 2C:
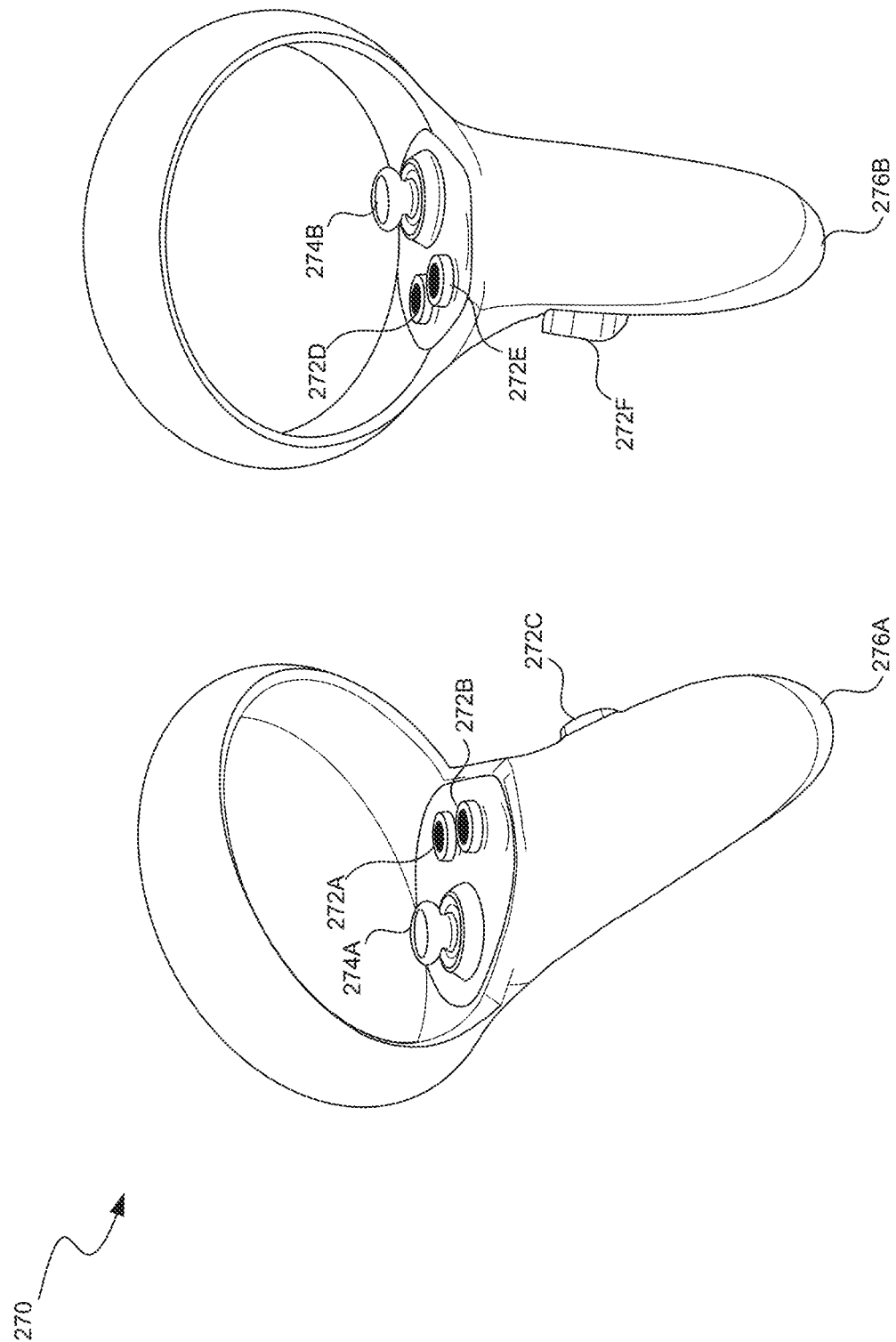
FIG. 2C is a wire diagram illustrating controllers which can be used in some implementations of the present technology.

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3 DoF or 6 DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc. To monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions.

Figure 3:
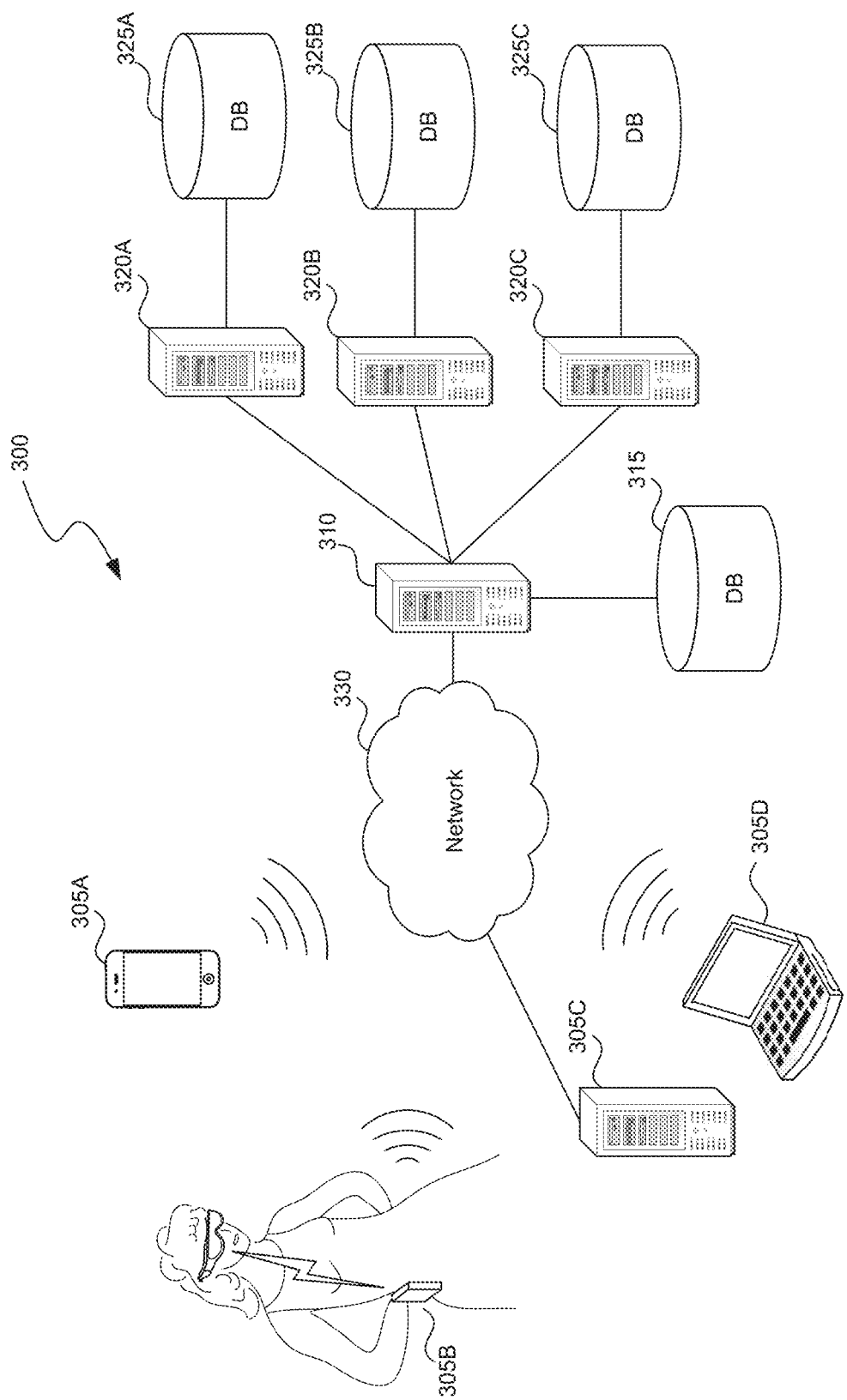
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
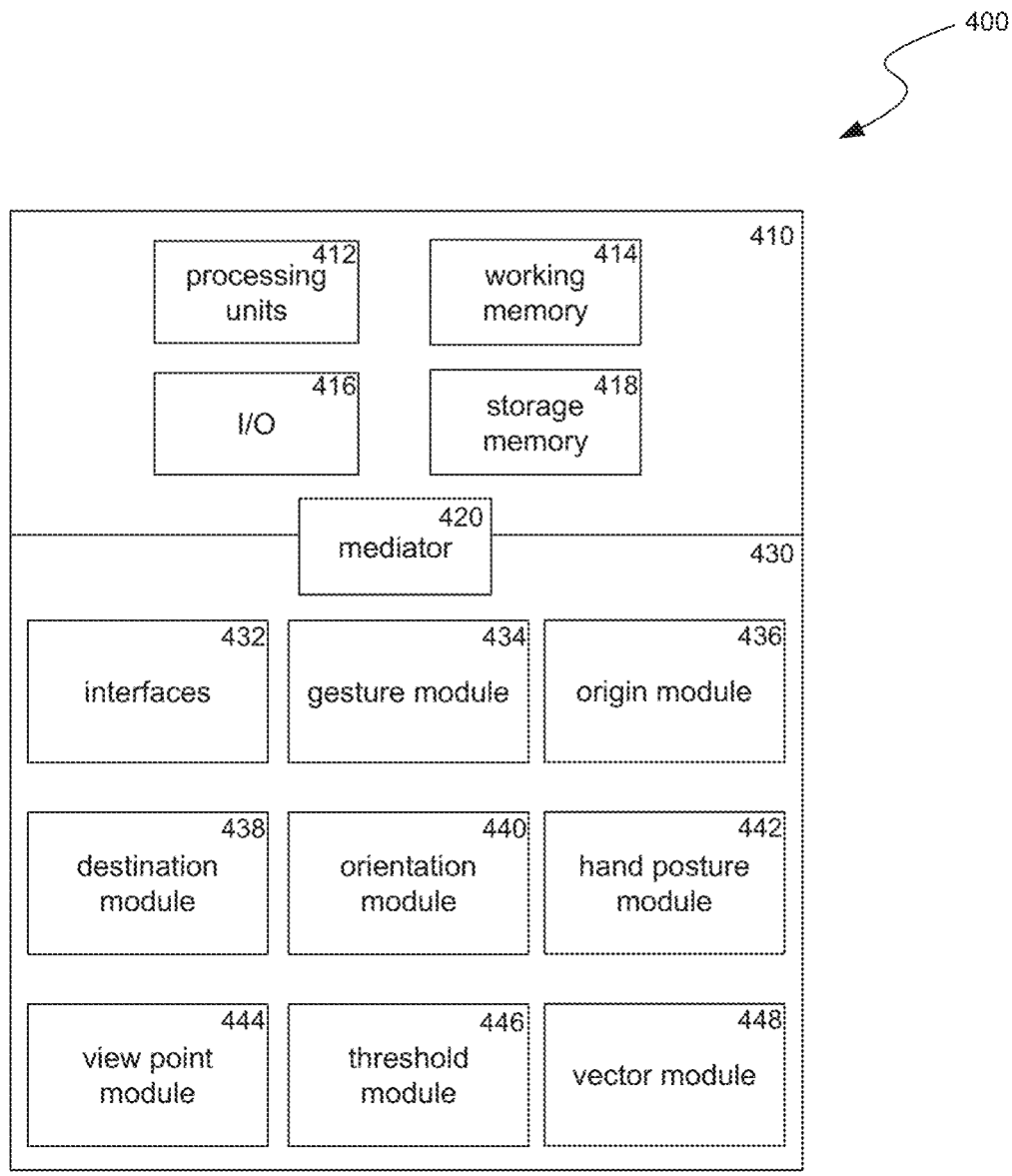
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for locomotion in VR via hand gestures. Specialized components 430 can include gesture module 434, origin module 436, destination module 438, orientation module 440, hand posture module 442, view point module 444, threshold module 446, vector module 448, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

In some embodiments, the gesture module 434 is configured to identify hand gestures of the user. The hand gestures can include teleport gestures, destination selection gestures, movement gestures, turn gestures, etc. Additional details on hand gestures are provided below in relation to blocks 504, 512, and 522 in FIG. 5, blocks 1004 and 1014 in FIG. 10A-1, blocks 1034 and 1046 in FIG. 10A-2, blocks 1064 and 1070 in FIG. 10B, and blocks 1304 and 1310 in FIG. 13.

In some embodiments, the origin module 436 is configured to set an origin point in the artificial reality environment at locations based on hand gestures of the user. The origin point can be the first location that a hand gesture is detected and is used as a reference location to compare the location of future hand movements. Additional details on the origin point are provided below in relation to blocks 506 and 516 in FIG. 5, block 1006 in FIG. 10A-1, block 1036 in FIG. 10A-2, block 1066 in FIG. 10B, and block 1306 in FIG. 13.

In some embodiments, the destination module 438 is configured to select a destination point in the artificial reality environment based on hand gestures of the user. The destination points can indicate the ending location of the user after the locomotion is complete. Additional details on the destination point are provided below in relation to blocks 510, 514, and 526 in FIG. 5. In some embodiments, the orientation module 440 is configured to determine an orientation of the user at the origin point or the destination point. The orientation of the user can indicate the direction the user will face after the locomotion is completed. Additional details on orientation are provided below in relation to blocks 520 and 524 in FIG. 5. In some embodiments, the hand posture module 442 is configured to monitor the hand posture to identify hand gestures of the user. The hand posture can change as the user moves her hand laterally, rotationally, or moves her fingers. Additional details on hand posture are provided below in relation to block 502 in FIG. 5.

In some embodiments, the view point module 444 is configured to set a view point to the user at a selected destination location. The view point of the user can change based on the orientation selected for a teleportation. Additional details on a user view points and orientations are provided below in relation to blocks 526 in FIG. 5, block 1012 in FIG. 10A-1, block 1044 in FIG. 10A-2, block 1072 in FIG. 10B, and block 1314 in FIG. 13.

In some embodiments, the threshold module 446 is configured to determine whether the user's hand position passes a distance threshold or whether the user has held a turn gesture for a threshold amount of time. Additional details on these thresholds are provided below in relation to blocks 1010 in FIG. 10A-1, blocks 1040 and 1042 in FIG. 10A-2, block 1044 in FIG. 10A-2, and block 1314 in FIG. 13. In some embodiments, the vector module 448 is configured to determine vectors in the X direction and Y direction based on the user's movement gestures from an origin point. The vectors can indicate rotation, speed of movement, and movement direction of the user. Additional details on vectors are provided below in relation to FIGS. 13-15.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
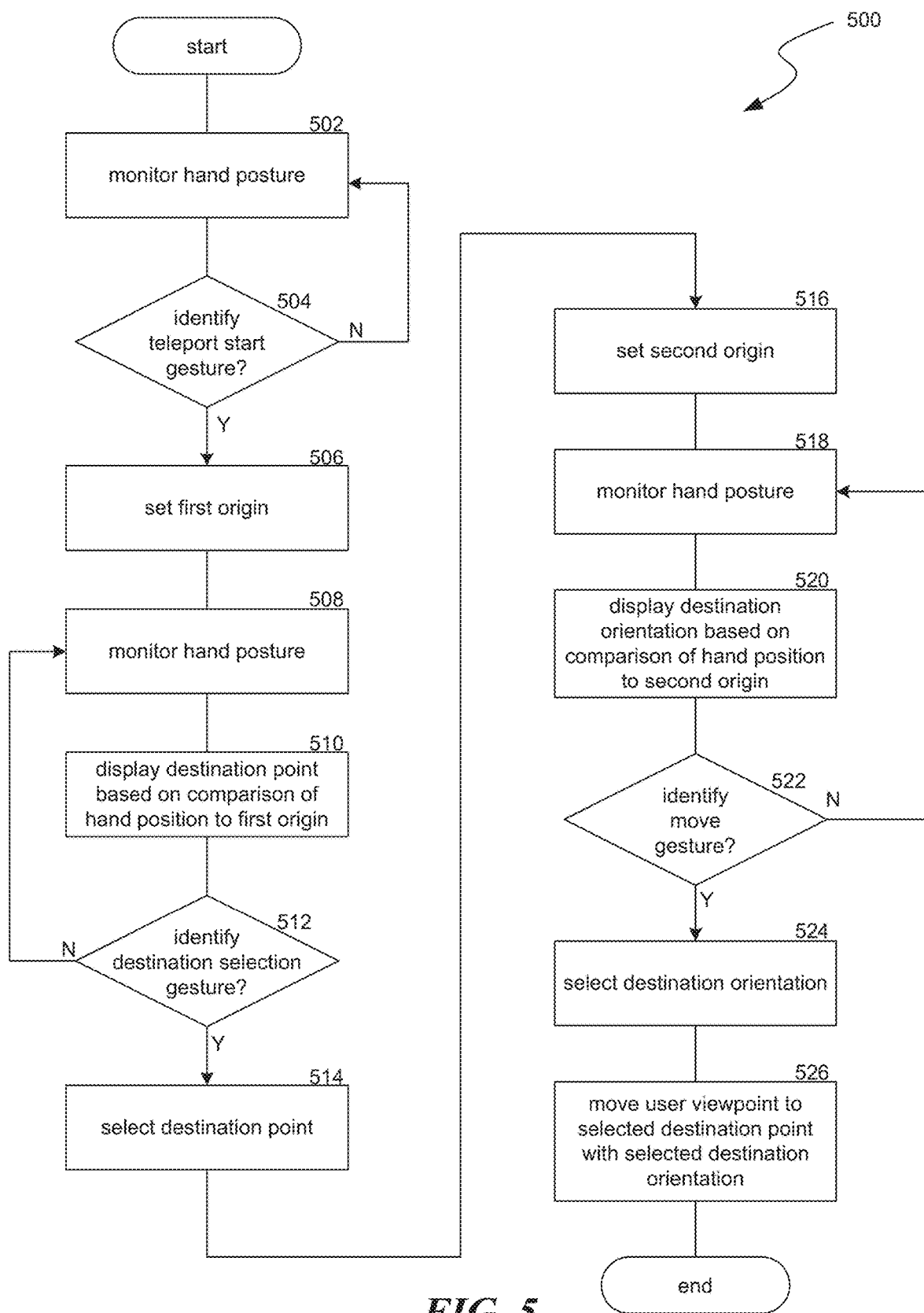
FIG. 5 is a flow diagram illustrating a process used in some implementations of the present technology for teleportation.

FIG. 5 is a flow diagram illustrating a process 500 used in some implementations for VR locomotion via hand gestures. Process 500 can be triggered by the user activating a teleportation mode, the user putting on a VR reality headset, an activation gesture by the user, a pressing a button on a control device, or process 500 is always operating and the user entering the VR environment triggers teleportation. Process 500 can be performed locally on the VR device or performed by cloud-based device(s) that can support user teleportation.

At block 502, process 500 can monitor the hand posture of user in the artificial reality environment. The process 500 can monitor the user hand posture continuously or periodically. A "posture" as used herein refers to a location and/or pose. For example, a hand posture can comprise one or both of where the hand is in an artificial reality environment and/or the shape the hand is making. Certain hand postures can be previously identified as "gestures," where the gesture is identified when the hand posture matches to a threshold amount. The processes described herein can monitor hand postures in different manners. In some cases, hand postures can be identified using input from external facing cameras that capture depictions of user hands. In other cases, hand postures can be based on input from a wearable device such as a glove or wristband that tracks aspects of the user's hands. In some implementations, input can be interpreted as postures mapped as certain gestures by applying the input to a machine learning model trained to identify hand postures and/or gestures based on such input. In some implementations, heuristics or rules can be used to analyze the input to identify hand postures and/or gestures.

Figure 6B:
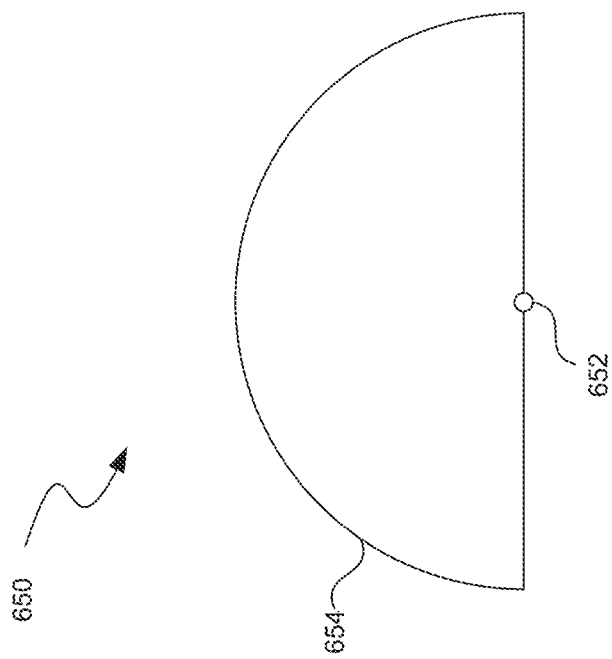
FIG. 6B is an illustration depicting an operating radius for teleportation.
Figure 6A:
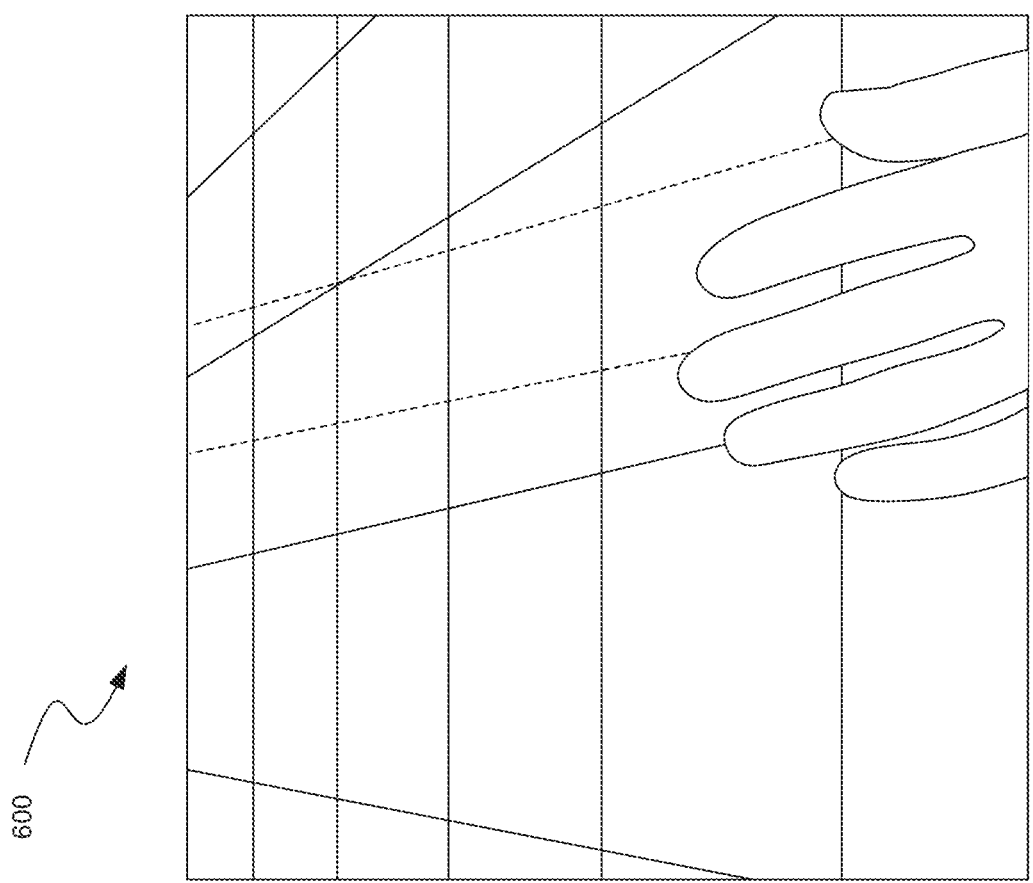
FIG. 6A is an illustration depicting a hand gesture for teleportation.

At block 504, process 500 can identify whether the user has made a teleport start gesture (an example of a teleport start gesture is illustrated in environment 600 of FIG. 6A) based on monitoring the hand posture of a user. In some cases, the teleport start gesture (e.g., open palm facing upward) is selected by the user or is pre-selected by the artificial reality system. When the teleport start gesture is identified, process 500 can continue to block 506. Otherwise, when process 500 does not identify the teleport start gesture and can continue to monitor the user's hand posture by returning to block 502.

At block 506, process 500 can set a first origin point (illustrated in environment 650 by origin point 652 in operating radius 654 of FIG. 6B) at a location that the teleport start gesture was identified. The origin point can be the starting location from which the user begins moving her hand. In some cases, process 500 can use the origin point as a reference location to compare the location of future user hand movements. At block 508, process 500 can monitor the hand posture of user in the artificial reality environment.

At block 510, process 500 can display a destination point (illustrated in environment 700 by destination point 702 of FIG. 7A), in the artificial reality environment, based on a first comparison of a first hand position to the first origin point. FIG. 7B illustrates environment 730 of the comparison of the hand position 732 to the origin point 652 in operating radius 654. In some cases, the destination point 702 has an exponential relationship to the distance from the origin point 652 to the hand position 732. In other cases, the destination point 702 has a linear relationship to the distance from the origin point 652 to the hand position 732. The destination point 702 can be connected to the hand position 732 by a ray 704. For example, process 500 can cast an angled-down ray out from the user's hand to the destination point. In some implementations, other types of rays can be used, such as a straight ray.

Figure 7D:
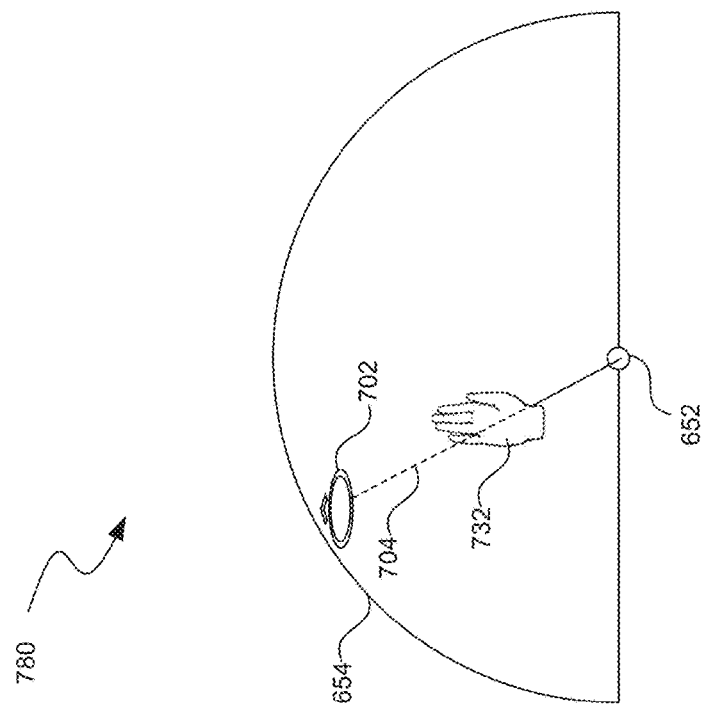
FIG. 7D is an illustration depicting an operating radius for teleportation.
Figure 7C:
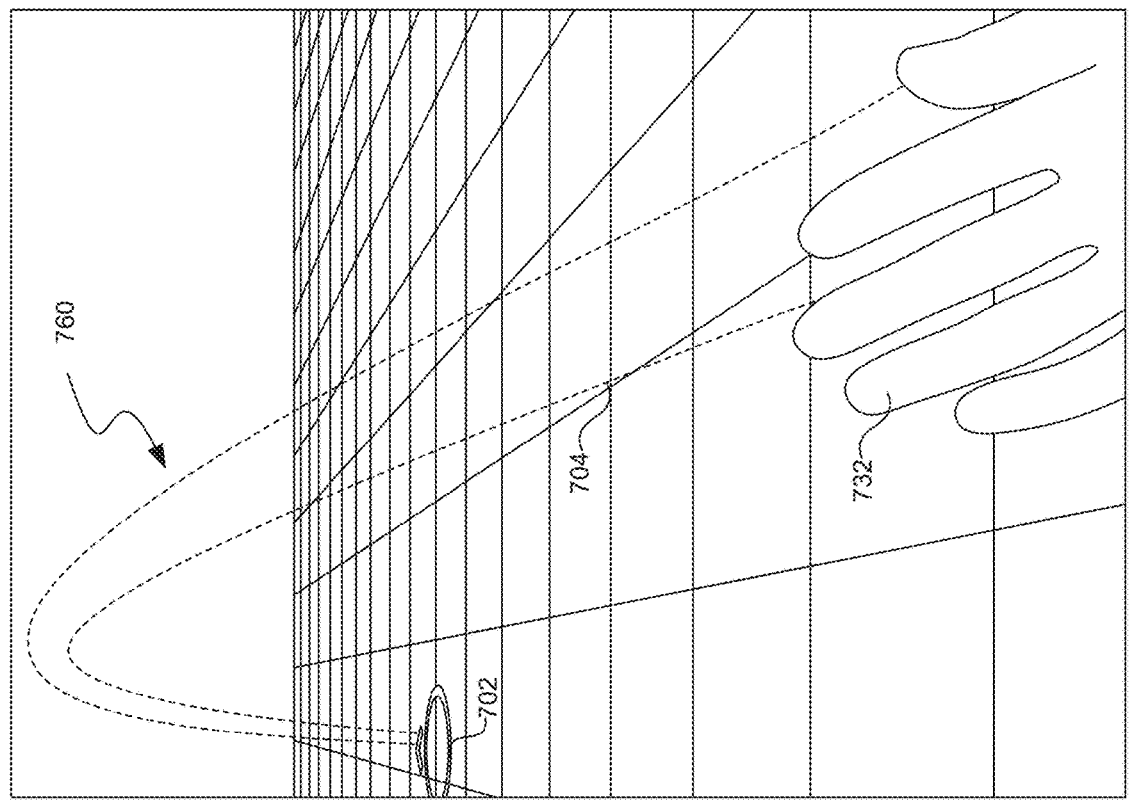
FIG. 7C is an illustration depicting a hand gesture for teleportation.

Environment 760 of FIG. 7C and environment 780 of FIG. 7D illustrate destination point 702 has an exponential relationship to the distance from the origin point 652 to the hand position 732 in operating radius 654. For example, the distance between the hand position 732 and the destination point 702 can be exponentially larger than the distance of the hand position 732 to the origin point 652.

Figure 8B:
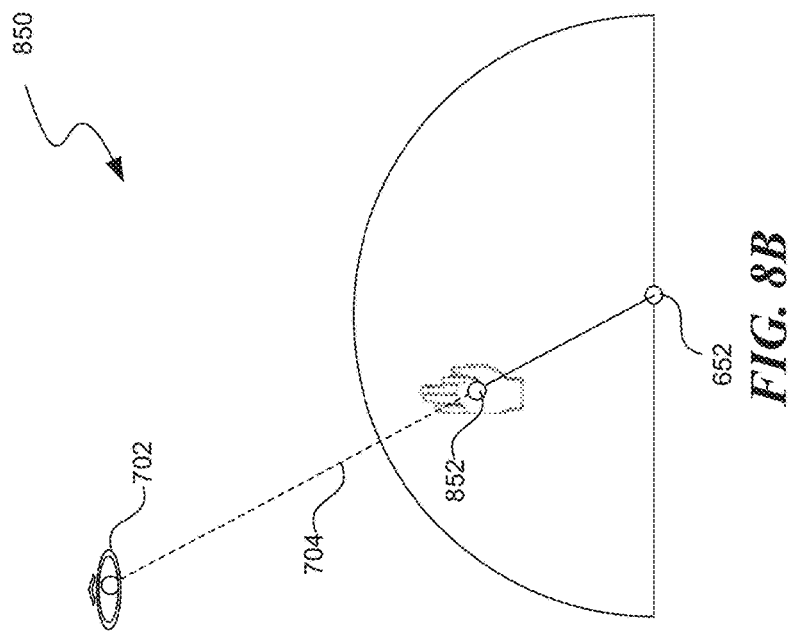
FIG. 8B is an illustration depicting an operating radius for teleportation.
Figure 8A:
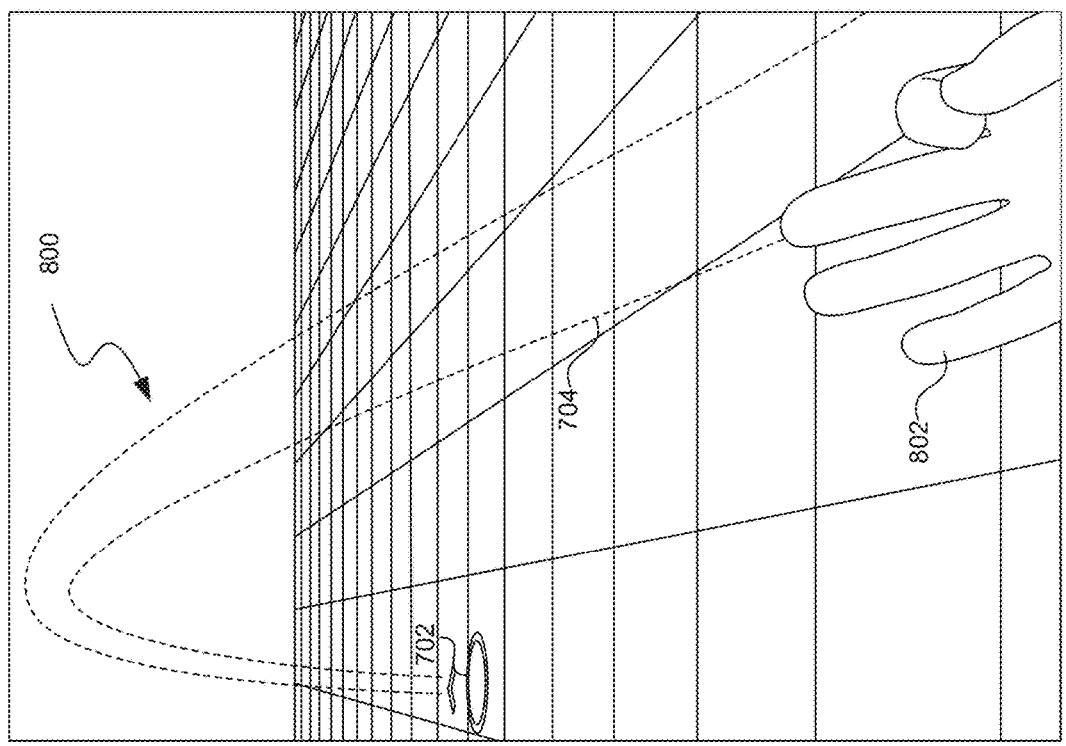
FIG. 8A is an illustration depicting a hand gesture for teleportation.

At block 512, process 500 can identify a destination selection gesture (e.g., pinching together of fingers on the user's hand) based on monitoring the hand posture of the user. When the destination selection gesture is identified, process 500 can continue to block 514. Otherwise, when process 500 does not identify the destination selection gesture, process 500 can continue to monitor the user's hand posture by returning to block 508. FIG. 8A illustrates an example of a destination selection gesture 802 to select the destination point 702 in environment 800.

At block 514, process 500 can select the destination point based on the position of the displayed destination point when the destination selection gesture was made. At block 516, process 500 can set a second origin point at a location of the destination selection gesture. The second origin point can be the destination point and a new starting location from which the user begins moving her hand to indicate the destination orientation. In some cases, process 500 can use the second origin point as a reference location to compare the location of the user hand movements around the second origin point to determine orientation at the destination point. FIG. 8B illustrates the second origin point 852 in environment 850. At block 518, process 500 can monitor the hand posture of user in the artificial reality environment.

At block 520, process 500 can determine a destination orientation based on a second comparison of a second hand position (monitored at block 518) to the second origin point set at block 516. The destination orientation can indicate which direction the user will face after teleportation. FIG. 9A illustrates the destination orientation 902 of the destination point 702 in environment 900. In some cases, the user can change the destination orientating by moving her hand in relation to the second origin point. FIG. 9B illustrates the user's hand with the destination selection gesture 802 positioned in relation to the second origin point 852 (as shown by arrow 952 resulting in the comparison of the origin point 852 to the hand position 802) to determine a destination orientation 902 in environment 950 corresponding to arrow 952.

At block 522, process 500 can identify a movement gesture (e.g., releasing the pinched together figures on the user's hand) based on monitoring the hand posture of the user. When the movement gesture is identified, process 500 can continue to block 524. Otherwise, when process 500 does not identify the movement gesture, process 500 can continue to monitor the user's hand posture by returning to block 518. At block 524, process 500 can select the destination orientation based on the determined destination orientation when the movement gesture was identified. At block 526, process 500 can move a view point of the user to the selected destination point with the selected destination orientation. In some cases, the hand gestures (e.g., teleport start and end gestures, destination selection gesture, movement gestures, etc.) are performed by one hand or two hands of the user. For example, a user can perform the gestures to select the destination point with one hand and can perform the gestures to select the destination orientation with the other hand.

Figures 1, 10A:
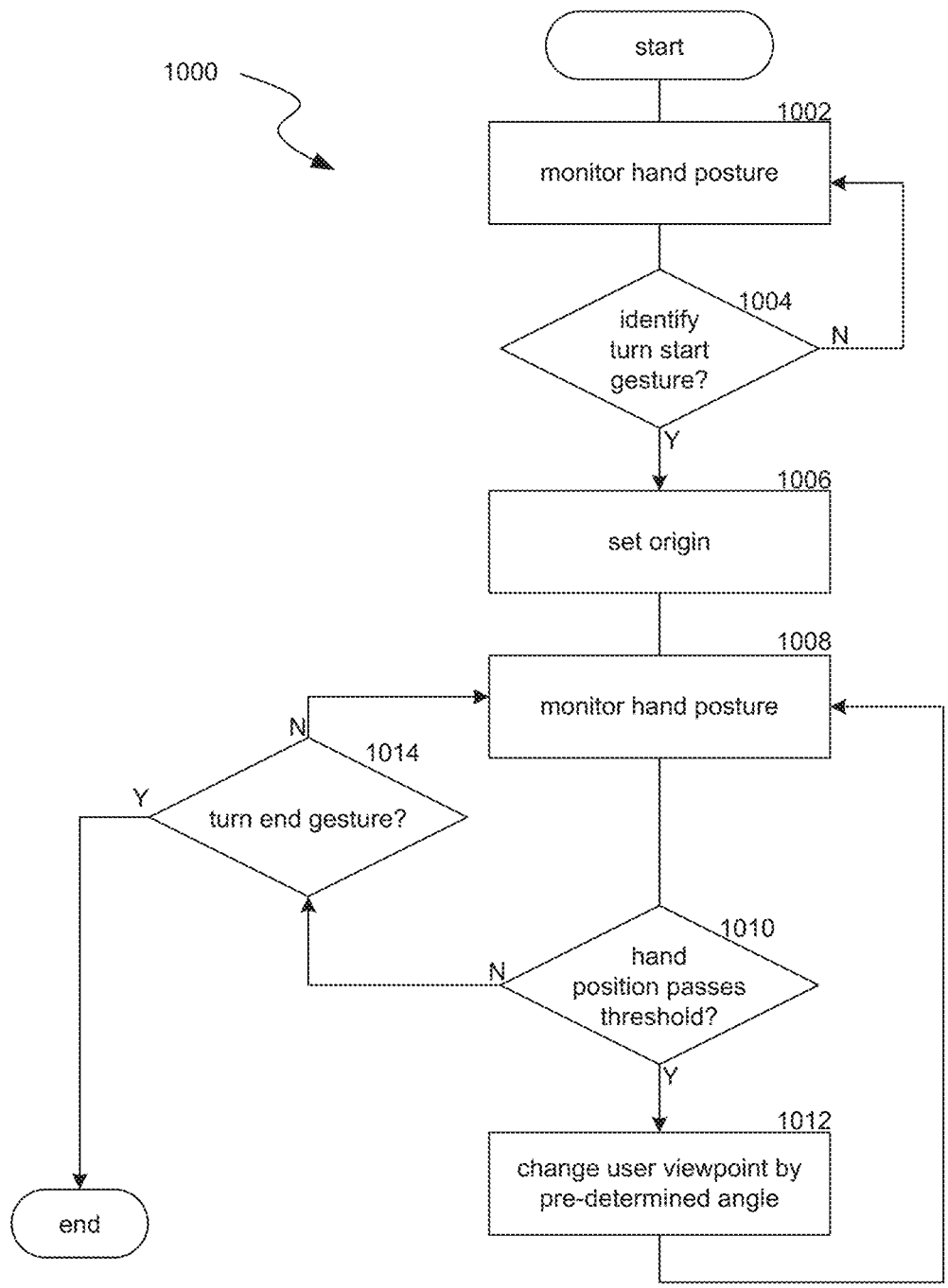

FIG. 10A-1 is a flow diagram illustrating a process 1000 used in some implementations for VR locomotion via hand gestures. Process 1000 can be triggered by the user activating a locomotion mode, the user putting on a VR reality headset, an activation gesture by the user, a button on a control device, or process 1000 is always operating and the user entering the VR environment triggers locomotion. Process 1000 can be performed locally on the VR device or performed by cloud-based device(s) that can support user locomotion.

At block 1002, process 1000 can monitor the hand posture of user in the artificial reality environment. At block 1004, process 1000 can identify whether the monitored hand posture matches a turn start gesture (e.g., pinching together of fingers on the user's hand). When the turn start gesture is identified, process 1000 can continue to block 1006. Otherwise, when process 1000 does not identify the turn start gesture, process 1000 can continue to monitor the user's hand posture by returning to block 1002.

At block 1006, process 1000 can set an origin point at a location of the turn start gesture. The origin point can be the starting location from which the user begins moving her hand to indicate the how far to turn. In some cases, process 1000 can use the origin point as a reference location to compare the location of the user hand movements away from the origin point to determine orientation after turning.

At block 1008, process 1000 can monitor the hand posture of user, in relation to the origin point, in the artificial reality environment.

At block 1010, process 1000 can determine whether a hand position passes a threshold (e.g., every threshold amount of distance, such as every 0.5, 1, 2, 3 inches, etc.), compared to the origin point, based on monitoring the hand posture. For example, as illustrated in environment 1100 of FIG. 11A, the user makes a turn start gesture 1104 with their hand and drags away from the origin point 1102 to change the user's view point. When the hand position passes the threshold, process 1000 can continue to block 1012. Otherwise, when the hand position does not pass the threshold process 1000 can continue block 1014.

Figure 12A:
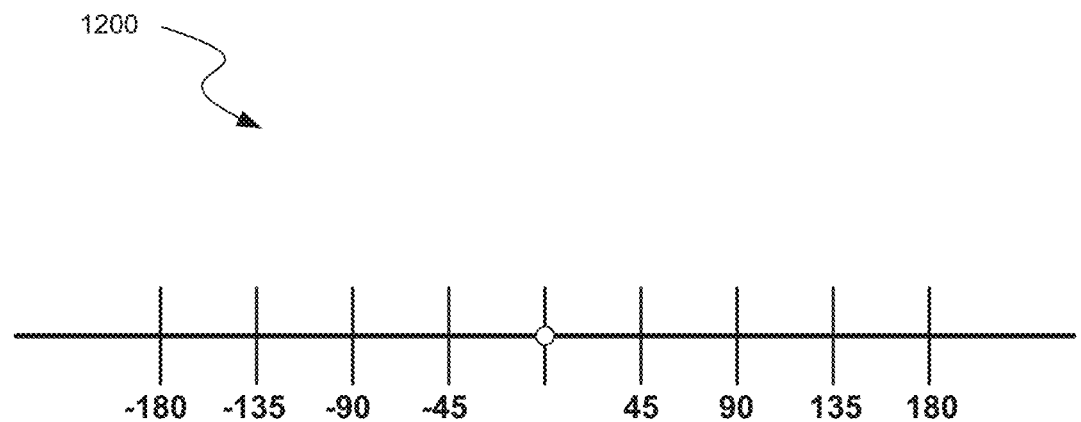
FIG. 12A is an illustration depicting rotation increments based on a hand position.

At block 1012, process 1000 can change a user viewpoint by a pre-determined angle (e.g., 15, 45, or 90 degrees). For example, as illustrated in environment 1200 of FIG. 12A, the user viewpoint changes by increments of 45 degrees each time the user's hand position passes a corresponding threshold distance compared to the origin point. In some cases, the user's view point can change by a counter clockwise or clockwise rotation based on whether the turn gesture is dragged to the right or left of the origin point. In some implementations, the increments of rotation can be any pre-determined angle. In some cases, after changing the user viewpoint, process 1000 returns to block 1008, where it continues to monitor the user's hand posture.

At block 1014, process 1000 can identify whether the monitored hand posture matches a turn end gesture (e.g., releasing the pinched together figures on their hand). If so, process 1000 can end. Otherwise, where process 1000 does not identify the turn end gesture, process 1000 can continue to monitor the user's hand posture by returning to block 1008.

Figures 2, 10A:
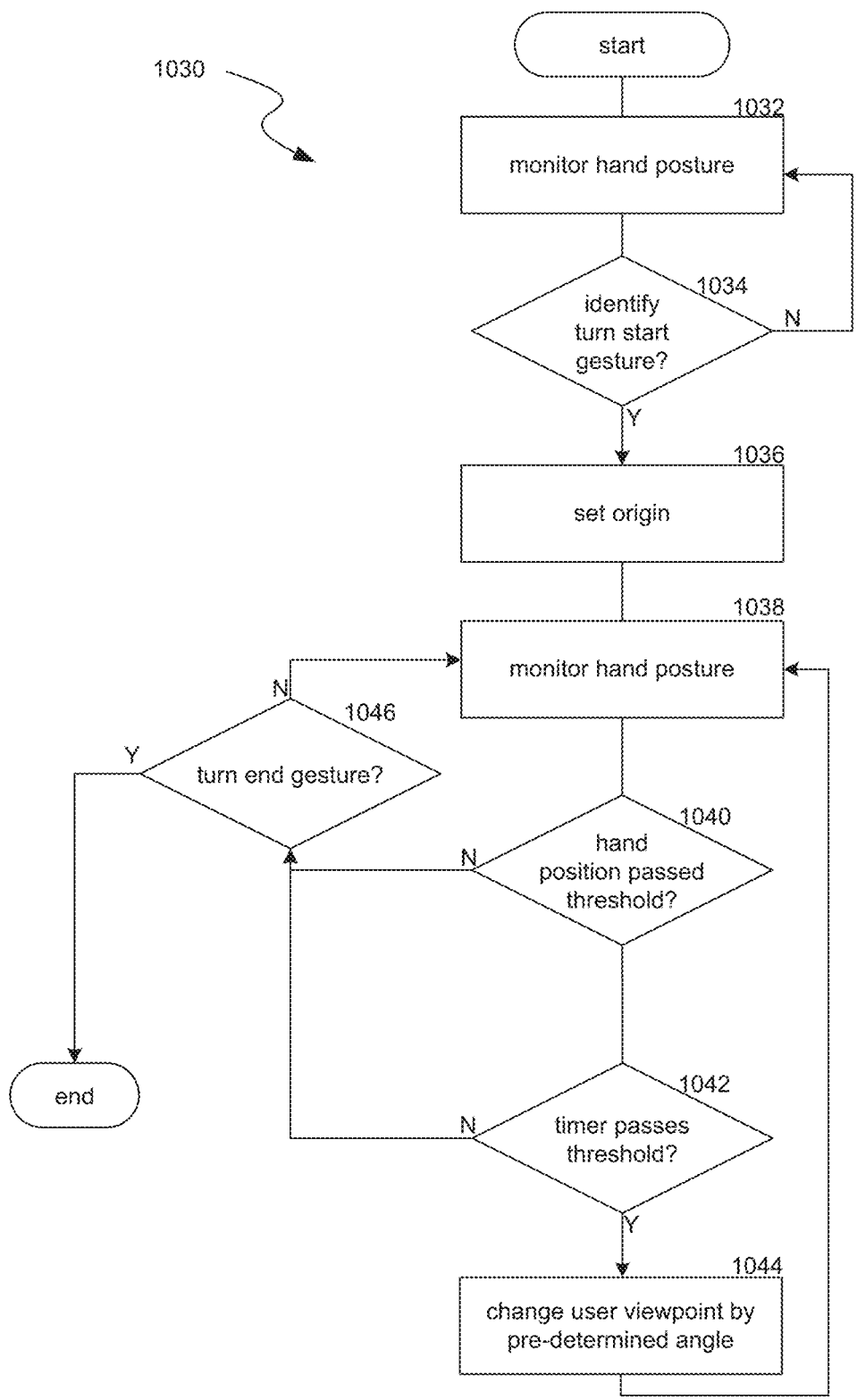

FIG. 10A-2 is a flow diagram illustrating a process 1030 used in some implementations for VR locomotion via hand gestures. Process 1030 can be triggered by the user activating a locomotion mode, the user putting on a VR reality headset, an activation gesture by the user, a button on a control device, or process 1030 is always operating and the user entering the VR environment triggers locomotion. Process 1030 can be performed locally on the VR device or performed by cloud-based device(s) that can support user locomotion.

At block 1032, process 1030 can monitor the hand posture of user in the artificial reality environment. At block 1034, process 1030 can identify whether the monitored hand posture matches a turn start gesture. When the turn start gesture is identified, process 1000 can continue to block 1006. Otherwise, when process 1030 does not identify the turn start gesture, process 1030 can continue to monitor the user's hand posture by returning to block 1032.

At block 1036, process 1030 can set an origin point at a location of the turn start gesture. The origin point can be the starting location from which the user begins moving her hand to indicate the how far to turn. In some cases, process 1030 can use the origin point as a reference location to compare the location of the user hand movements away from the origin point to determine how much to turn the user.

At block 1038, process 1030 can monitor the hand posture of user, in relation to the origin point, in the artificial reality environment.

At block 1040, process 1030 can determine whether a hand position is passed a distance threshold (e.g., every threshold amount of distance, such as every 0.5, 1, 2, 3 inches, etc.), compared to the origin point, based on monitoring the hand posture. For example, as illustrated in environment 1100 of FIG. 11A, the user makes a turn start gesture 1104 with their hand and drags away from the origin point 1102 to change the user's view point. In some cases, process 1030 can loop between blocks 1038-1044 multiple times, and the hand position can be past the threshold by virtual of the user moving her hand past the threshold in a previous loop iteration and having held it there in subsequent loop iterations. When the hand position is passed the threshold, process 1030 can continue to block 1042. Otherwise, when the hand position does not pass the threshold process 1030 can continue block 1046.

At block 1042, process 1030 can determine whether a timer has also passed a next time threshold (e.g., every threshold amount of time, such as every 0.1, 0.5, or 1 second) while the hand position is past the distance threshold. For example, the user can drag a pinching gesture away from the origin point past a threshold distance (e.g., 1, 2, 3 inches, etc.) and, for each time threshold (e.g., 1 second) that the user holds the pinching gesture while past the distance threshold, the location of the user viewpoint changes. When the timer passes the time threshold, process 1030 can continue to block 1044. Otherwise, when the timer does not pass the timer threshold process 1030 can continue block 1046.

Figure 12B:
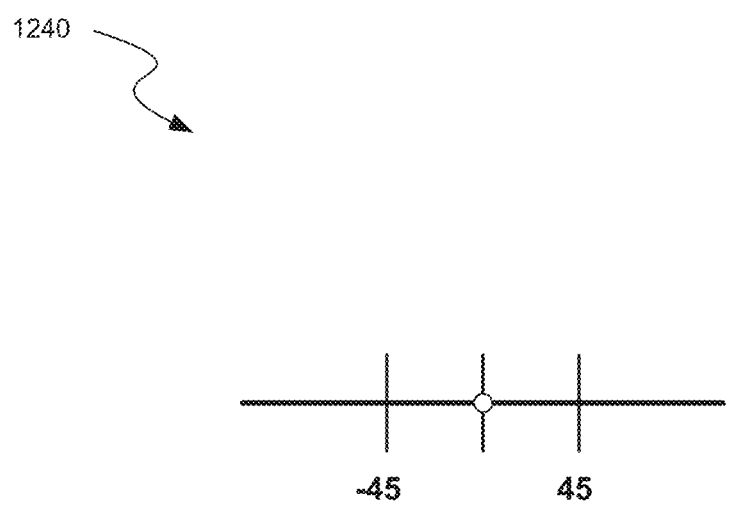
FIG. 12B is an illustration depicting rotation increments based on a timer for locomotion.

At block 1044, process 1030 can change a user viewpoint by a pre-determined angle (e.g., 5, 15, 30, 45, or 90 degrees). The process 1030 can change the user viewpoint in response to the timer passing the time threshold. For example, as illustrated in environment 1240 of FIG. 12B, the user viewpoint changes by increments of 45 degrees when the timer passes the time threshold, while the hand position is past the distance threshold. In some implementations, the increments of rotation can be any pre-determined angle.

In some cases, process 1030 continues to monitor the user's hand posture to determine the user's hand position passes the threshold. At block 1046, process 1030 can identify whether the hand posture matches a turn end gesture. If so, process 1030 can end. Otherwise where process 1030 does not identify the turn end gesture, process 1030 can continue to monitor the user's hand posture by returning to block 1038.

Figure 10B:
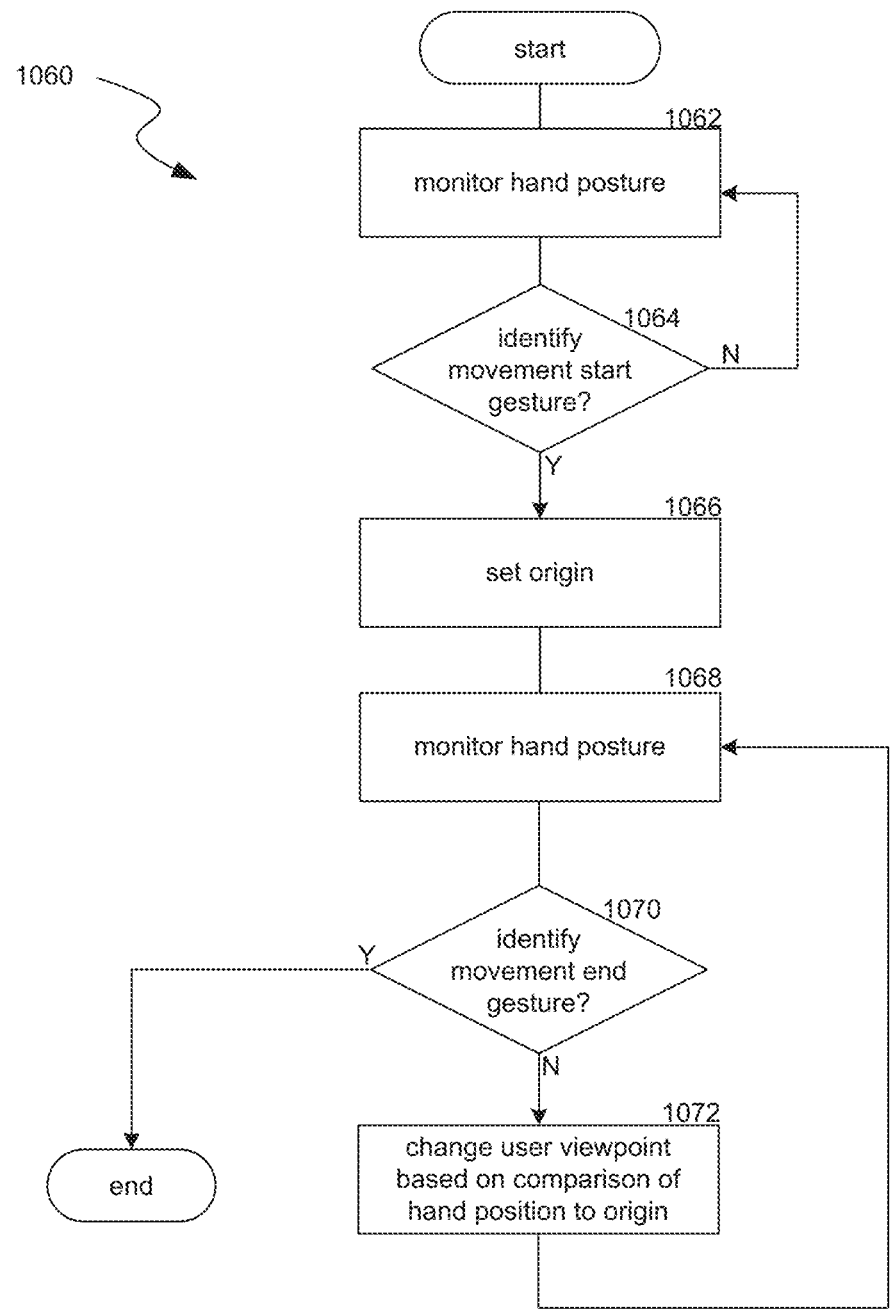
FIG. 10B is a flow diagram illustrating a process used in some implementations of the present technology for implementing a movement gesture.

FIG. 10B is a flow diagram illustrating a process 1060 used in some implementations for VR locomotion via hand gestures. Process 1060 can be triggered by the user activating a locomotion mode, the user putting on a VR reality headset, an activation gesture by the user, a button on a control device, or process 1060 is always operating and the user entering the VR environment triggers locomotion. Process 1060 can be performed locally on the VR device or performed by cloud-based device(s) that can support user locomotion.

At block 1062, process 1060 can monitor the hand posture of user in the artificial reality environment. At block 1064, process 1060 can identifying whether the monitored hand posture matches a movement start gesture (e.g., pinching together figures on the user's hand, thumbs up gesture, etc.). When the movement start gesture is identified, process 1060 can continue to block 1066. Otherwise, when process 1060 does not identify the movement start gesture, process 1060 can continue to monitor the user's hand posture by returning to block 1062.

At block 1066, process 1060 can set an origin point at a location of the movement start gesture. The origin point can be the starting location from which the user begins moving her hand to indicate the how far process 1060 should move the user. In some cases, process 1060 can use the origin point as a reference location to compare the location of the user hand movements away from the origin point to determine direction, distance, and orientation of the user. At block 1068, process 1060 can monitor the hand posture of user in relation to the origin point, in the artificial reality environment.

At block 1070, process 1060 can identify whether the monitored hand posture matches a movement end gesture (e.g., releasing the pinched together figures on the user's hand, thumbs down gesture, etc.) If so, process 1060 can end. Otherwise, where process 1060 does not identify the movement end gesture, process 1000 can continue to block 1072.

At block 1072, process 1060 can change the user viewpoint based on a comparison of the user hand position to the origin point. This comparison can determine a distance between the user's hand and the origin point in the X/Y plane. FIG. 12C illustrates the user's hand position 1274 in relation to the origin point 1272 in environment 1270. The system is making a comparison to determine a length of vector 1276 in the X/Y plane. The location and viewpoint of the user will change in the VR environment 1270, where the speed of this movement can be proportional to the determined length of vector 1276. In various implementations, the movement can be directly forward from the user's current view or can be angled according to a direction of the vector 1276. The system can continue to update the viewpoint of the user (e.g., every threshold amount of time, such as every 0.1, 0.5, or 1 second), until the user makes the movement end gesture (e.g., releasing the pinched together figures on their hand). For example, the user can make the movement start gesture (e.g., a pinch gesture) at origin point 1272 and moves (e.g., drags) her hand to the hand position 1274, causing the viewpoint to change, moving her forward in the artificial reality environment by an amount corresponding to the distance between the origin point and the new hand position. At hand position 1274, the user makes the movement end gesture, and no further movement is made.

Figure 11B:
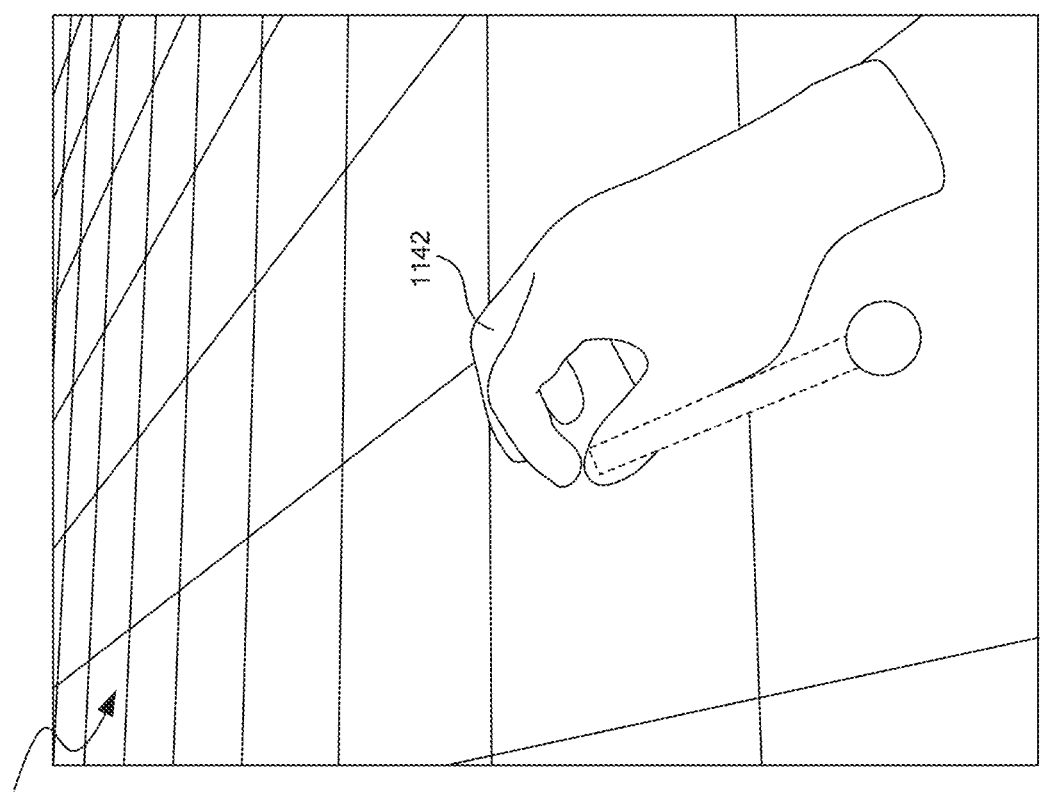
FIG. 11B is an illustration depicting a movement gesture for locomotion.
Figure 11A:
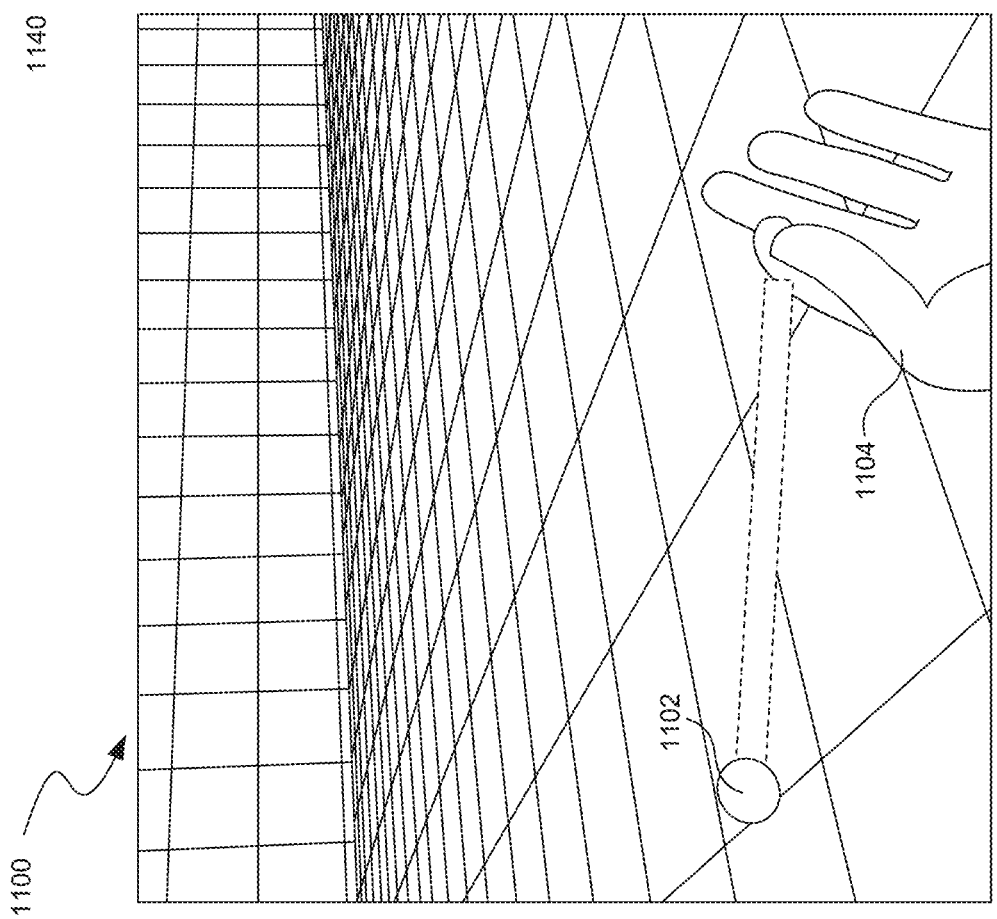
FIG. 11A is an illustration depicting a turn gesture for locomotion.

From block 1072, process 1060 continues to monitor the user's hand posture by returning to block 1068. In some cases, the user performs the movement start gesture and movement end gesture with a single hand. In other cases, the user performs the movement start gesture and the movement end gesture with two hands. In some implementations, the user separately controls forward/backward movement and the direction orientation the user is facing. For example, as illustrated in FIGS. 11A and 11B, the user controls rotation (e.g., turn-in-place by incremental degrees—see alternative processes 10A-1 and 10A-2) with one hand in environment 1100 and controls forward/backward movement (see process 10B) with their other hand in environment 1140. The user can pinch and drag to specify a direction of movement (as illustrated in FIG. 11B) or can pinch and drag to specify orientation (as illustrated in FIG. 11A).

In other implementations, the user controls forward/backward movement and the direction orientation the user is facing with the same hand, depending on which gesture is being held. For example, as illustrated in FIGS. 11B and 11C, the user controls forward/backward movement (see process 10B) with a first gesture 1142 (e.g., pinch with index finger) in environment 1140 and controls rotation (alternative processes 10A-1 and 10A-2) with a second gesture 1172 (e.g., pinch with middle finger) in environment 1170.

Figure 13:
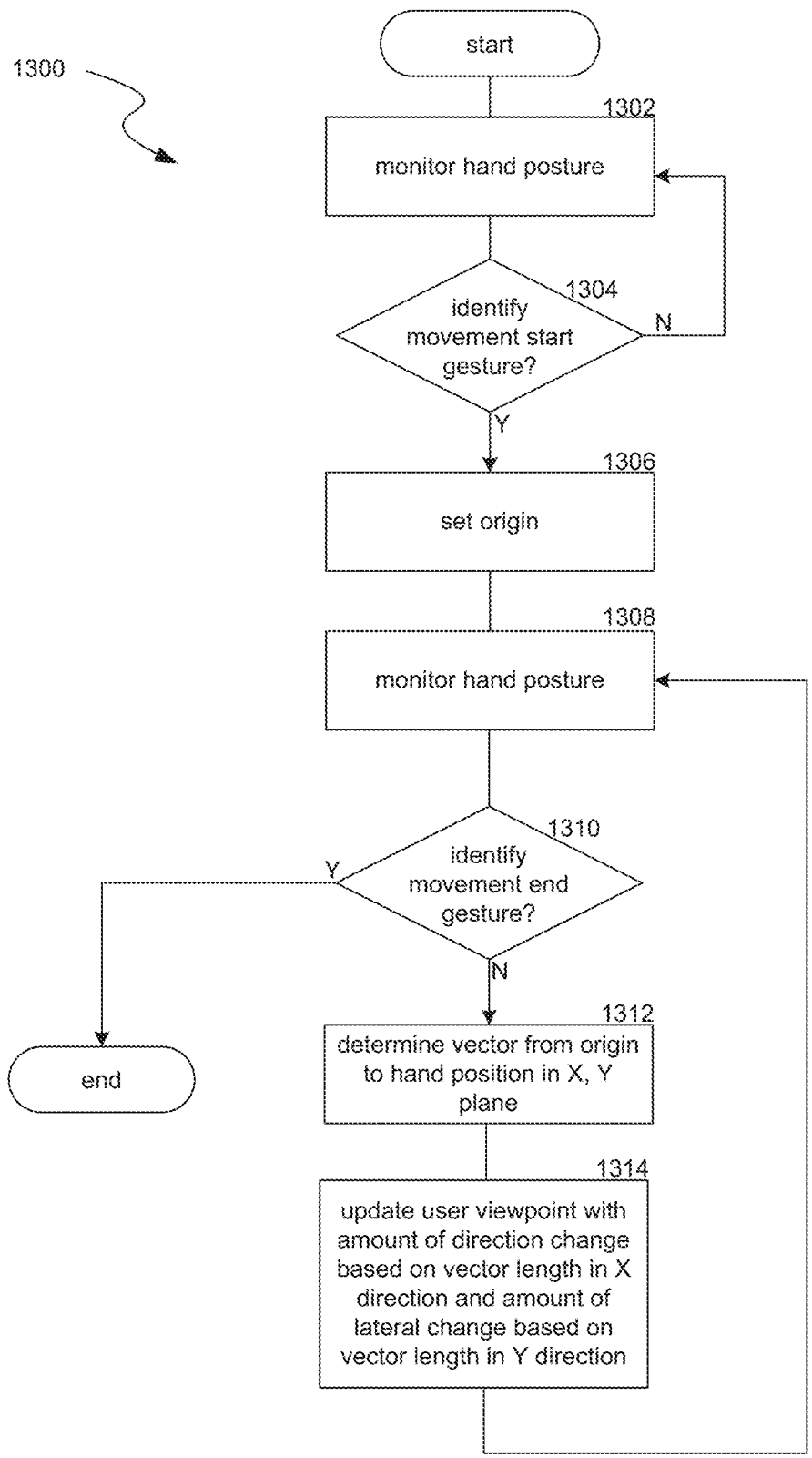
FIG. 13 is a flow diagram illustrating a process used in some implementations of the present technology for locomotion based on single-hand movements in an X-Y plane.

FIG. 13 is a flow diagram illustrating a process 1300 used in some implementations for VR locomotion via hand gestures. Process 1300 can be triggered by the user activating a locomotion mode, the user putting on a VR reality headset, an activation gesture by the user, a button on a control device, or process 1300 is always operating and the user entering the VR environment triggers locomotion. Process 1300 can be performed locally on the VR device or performed by cloud-based device(s) that can support user locomotion.

At block 1302, process 1300 can monitor the hand posture of user in the artificial reality environment. At block 1304, process 1300 can identifying whether the monitored hand posture matches a movement start gesture (e.g., the user pinching together figures on their hand as illustrated in environment 1400 by movement start gesture 1404 of FIG. 14). When the movement start gesture is identified, process 1300 can continue to block 1306. Otherwise, when process 1300 does not identify the movement start gesture, process 1300 can continue to monitor the user's hand posture by returning to block 1302.

At block 1306, process 1300 can set an origin point at a location of the movement start gesture. The origin point can be the starting location from which the user begins moving her hand to indicate the how far process 1300 should move the user. In some cases, process 1300 can use the origin point as a reference location to compare the location of the user hand movements away from the origin point to determine the direction, distance, and orientation of the user after a movement gesture is completed. At block 1308, process 1300 can monitor the hand posture of user, in relation to the origin point, in the artificial reality environment. At block 1310, process 1300 can identify whether the hand posture matches a movement end gesture. In some cases, the movement end gesture is the user releasing the movement start gesture (e.g., releasing the pinching together of the figures on their hand). When the movement end gesture is identified, process 1300 can end. Otherwise, when process 1300 does not identify the movement end gesture, process 1300 can continue to block 1312.

At block 1312, process 1300 can determine a vector based on a difference between the origin point and a hand position of the user in an X direction and a Y direction. At block 1314, process 1300 can update a user viewpoint with an amount of direction change based on a length of the vector in the X direction and amount of lateral change based on a length of the vector in the Y direction. Process 1300 can then continue to monitor the user's hand posture by returning to block 1308. In some implementations, the amount of direction change has an exponential relationship to the length of the vector is the X direction. In other implementations, the amount of lateral change has an exponential relationship to the length of the vector in the Y direction.

Figure 14:
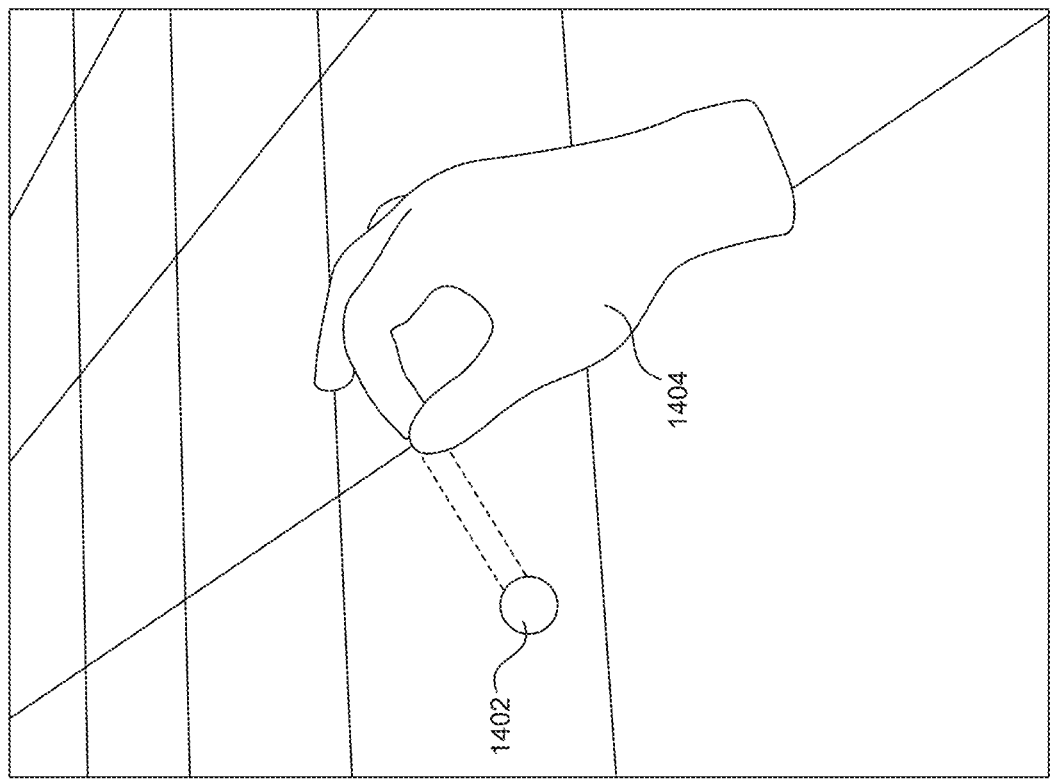
FIG. 14 is an illustration depicting a hand gesture for locomotion based on single-hand movements in an X-Y plane.
Figure 15:
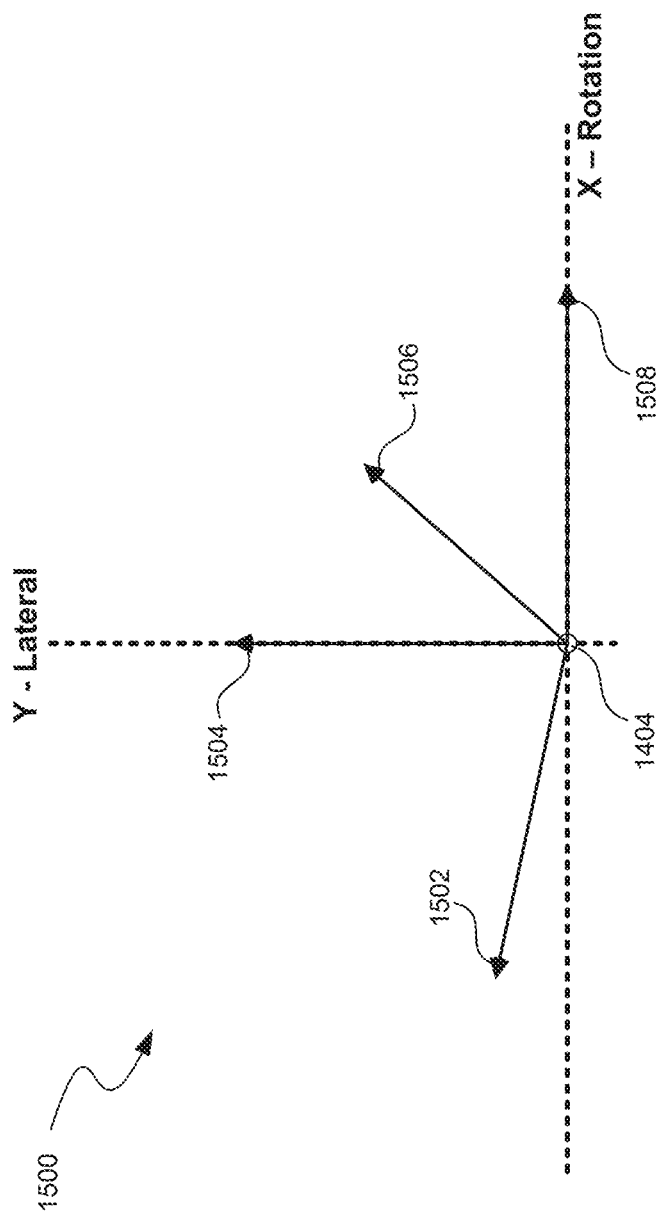
FIG. 15 is an illustration depicting interpretations of X-Y plane vectors of hand movements.

FIG. 14 illustrates an example movement start gesture 1404 while the user moves her hand away from origin point 1404 in an X direction and Y direction. FIG. 15 illustrates the X-Y plane of operation (described in FIG. 13) with origin point 1404 at the center of the X-Y plane in environment 1500. The Y direction can indicate lateral movement and the X direction can indicate rotational movement.

Vectors 1502, 1504, 1506, and 1508 illustrate examples of different hand movements of the user in relation to the origin point 1404. In an example, vector 1502 illustrates the user's hand moved forward (Y direction) and to the left (X-direction), which results in the viewpoint of the user moving forward an amount proportional to the length of the vector 1502 in the Y direction and rotating counter clockwise an amount proportional to the length of the vector 1502 in the X direction. In another example, vector 1504 illustrates the user's hand moved forward (Y direction), which results in the user's viewpoint moving forward an amount proportional to the length of the vector 1504 in the Y direction with no rotational movement. In another example, vector 1506 illustrates the user's hand moved forward (Y direction) and to the right (X direction), which results in the viewpoint of the user moving forward an amount proportional to the length of the vector 1506 in the Y direction and rotating clockwise an amount proportional to the length of the vector 1506 in the X direction. In another example, vector 1508 illustrates the user's hand moved only to the right (X direction), which results in the viewpoint of the user rotating clockwise an amount proportional to the length of the vector 1508 in the X direction with no forward movement.

In some implementations, processes 500, 1000, 1030, 1060, and 1300 can use a machine learning model to identify locomotion hand gestures (e.g., teleport gestures, destination selection gestures, movement gestures, turn gestures, etc.). The machine learning model can be trained using data specifying pre-selected gestures and the monitoring of the user hand posture can be performed by a machine learning model trained to monitor the user gesture preferences, where the machine learning model was trained using input such as images, wearable device telemetry or sensor data, etc. labeled with identified hand gestures.

A "machine learning model" or "model" as used herein, refers to a construct that is trained using training data to make predictions or provide probabilities for new data items, whether or not the new data items were included in the training data. For example, training data for supervised learning can include positive and negative items with various parameters and an assigned classification. A new data item can have parameters that a model can use to assign a classification to the new data item. As another example, a model can be a probability distribution resulting from the analysis of training data, such as a likelihood of an input matching a conclusion, a given a particular input, based on an analysis of a large corpus of inputs with corresponding correct conclusions. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, a hand locomotion model can be a neural network with multiple input nodes that receive image data (e.g., a histogram representation of an image). The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input that, once the model is trained, can be used as a gesture identification. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model (e.g., analyzing different parts of the image or different resolutions) as further input to produce results for the current input.

The hand locomotion machine learning model can be trained with supervised learning, where the training data includes the positive and negative training items as camera and/or sensor data measuring hand posture paired with labels of gestures for that hand posture. Output from the model can be compared to the desired output for that gesture and, based on the comparison, the model can be modified, such as by changing weights between nodes of the neural network or parameters of the functions used at each node in the neural network (e.g., applying a loss function). After applying each of the posture/gesture pairings in the training data and modifying the model in this manner, the model can be trained to evaluate whether new match given gestures. In some implementations, the processes 500, 1000, 1030, 1060, and 1300 can store results of the user's gestures as further training data and use that data to update the machine learning model.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method for performing virtual reality teleport locomotion via hand gestures, the method comprising:
   identifying a teleport start gesture based on monitoring a hand posture of a user;
   setting a first teleport origin point at a first location of the teleport start gesture;
   displaying a teleport destination point, in an artificial reality environment, based on a first comparison of A) a first hand position to B) the first teleport origin point;
   identifying a destination selection gesture based on monitoring the hand posture of the user;
   selecting, based on the destination selection gesture, the teleport destination point;
   setting a second teleport origin point at a second location corresponding to the destination selection gesture;
   determining a teleport destination orientation based on a second comparison of C) a second hand position to D) the second teleport origin point, wherein the determined teleport destination orientation is a direction that a viewpoint of the user will have, at the second teleport origin point, following the teleport locomotion;
   identifying a teleport movement gesture based on monitoring the hand posture of the user; and
   in response to the teleport movement gesture, performing the teleport locomotion by:
      selecting the determined teleport destination orientation; and
      moving a viewpoint of the user's gaze to the selected teleport destination point with direction of the selected destination orientation.

2. The method of claim 1, wherein the teleport start gesture is an open palm facing upward hand gesture, the destination selection gesture is a pinching together of fingers gesture, and the teleport movement gesture is a releasing of the pinching together of fingers gesture.

3. The method of claim 1, further comprising:
   displaying, in relation to the teleport destination point, an indication of the teleport destination orientation.

4. The method of claim 1, wherein the teleport destination orientation rotates around the second teleport origin point.

5. The method of claim 1, wherein a distance from the teleport destination point to the first hand position is displayed by a ray.

6. The method of claim 1, wherein a distance from the teleport destination point to the first teleport origin point has an exponential relationship to a distance between the first teleport origin point and the first hand position.

7. The method of claim 1, wherein the teleport start gesture, the destination selection gesture, and the teleport movement gesture are performed by one hand of the user.

8. A computing system for performing a turn locomotion via hand gestures, the computing system comprising:
   one or more processors; and
   one or more memories storing instructions that, when executed by the one or more processor, cause the computing system to perform a process comprising:

identifying a turn start gesture based on monitoring a hand posture of a user;

setting a turn origin point at a first location of the turn start gesture;

determining that a hand position passes a threshold, compared to the turn origin point, based on monitoring the hand posture;

in response to the hand position passing the threshold:
 determining a turn destination orientation based on the determining that the hand position passed the threshold a pre-determined angle, wherein the determined turn destination orientation is a direction that a viewpoint of a user will have, following the turn locomotion; and
 performing the turn locomotion by changing the viewpoint of the user's gaze by the pre-determined angle to the turn destination orientation; and identifying a turn end gesture based on monitoring the hand posture.

9. The computing system of claim 8, wherein the threshold is a distance threshold and wherein the process further comprises:
 while the hand position is past the distance threshold, determining that a timer passed a time threshold;
 in response to the timer passing the time threshold:
  further changing the user viewpoint by the pre-determined angle.

10. The computing system of claim 8, wherein the process further comprises:
 identifying a movement start gesture based on monitoring the hand posture of the user;
 setting a second origin point at a second location of the movement start gesture;
 determining a distance between a further determined position the user's hand and the second origin point; and
 changing the user viewpoint forward or backward by an amount that is based on the determined distance.

11. The computing system of claim 8, wherein the threshold is a first distance threshold and wherein the process further comprises:
 determining that the hand position passes a second distance threshold based on further monitoring the hand posture; and
 in response to the hand position passing the second distance threshold, further changing the viewpoint of the user's gaze by the pre-determined angle.

12. The computing system of claim 8, wherein the turn start gesture is a pinching together of fingers gesture.

13. The computing system of claim 8, wherein the turn start gesture and a movement start gesture, controlling forward and backward movement, are performed with separate hands.

14. The computing system of claim 8, wherein the turn start gesture and a movement start gesture, controlling forward and backward movement, are perfumed with different pinching gestures on a single hand of the user.

15. The computing system of claim 8, wherein the pre-determined angle is between fifteen and fifty degrees.

16. The computing system of claim 8, wherein a distance from the hand position to the turn origin point is displayed as a beam.

17. A non-transitory machine-readable storage medium having machine executable instructions stored thereon that, when executed by one or more processors, direct the one or more processors to perform a process comprising:
 identifying a teleport start gesture based on monitoring a hand posture of a user;
 setting a first teleport origin point at a first location of the teleport start gesture;
 displaying a teleport destination point, in an artificial reality environment, based on a first comparison of A) a first hand position to B) the first teleport origin point;
 identifying a destination selection gesture based on monitoring the hand posture of the user;
 selecting, based on the destination selection gesture, the teleport destination point;
 setting a second teleport origin point at a second location corresponding to the destination selection gesture;
 determining a teleport destination orientation based on a second comparison of C) a second hand position to D) the second teleport origin point, wherein the determined teleport destination orientation is a direction that a viewpoint of the user will have, at the second teleport origin point, following the teleport locomotion;
 identifying a teleport movement gesture based on monitoring the hand posture of the user; and
 in response to the teleport movement gesture, performing the teleport locomotion by:
  selecting the determined teleport destination orientation; and
  moving a viewpoint of the user's gaze to the selected teleport destination point with direction of the selected destination orientation.

18. The non-transitory machine-readable storage medium of claim 17, wherein the process further comprises:
 displaying, in relation to the teleport destination point, an indication of the teleport destination orientation.

19. The non-transitory machine-readable storage medium of claim 17, wherein the teleport destination orientation rotates around the second teleport origin point.

20. The non-transitory machine-readable storage medium of claim 17, wherein a distance from the teleport destination point to the first hand position is displayed by a ray.

* * * * *